United States Patent [19]

Kiuchi et al.

[11] Patent Number: 5,765,167

[45] Date of Patent: Jun. 9, 1998

[54] DATA FILE UPDATE PROCESSING APPARATUS

[75] Inventors: Hiroyoshi Kiuchi, Hachioji; Toshio Tohara, Ome; Masaaki Fukumura, Iruma; Kazumi Dote; Akihito Iwadate, both of Fussa; Takashi Kurihara, Musashimurayama; Jungi Mori, Tachikawa; Satoru Hirata, Chiba; Kenji Nozaki, Hachioji, all of Japan

[73] Assignee: Casio Computer Co., Ltd., Tokyo, Japan

[21] Appl. No.: 567,599

[22] Filed: Dec. 5, 1995

[30] Foreign Application Priority Data

Dec. 26, 1994 [JP] Japan ............................ 6-336677

[51] Int. Cl.⁶ ........................................ G06F 17/30
[52] U.S. Cl. ................................ 707/200; 707/102
[58] Field of Search .............................. 395/601, 616, 395/617, 619; 707/4, 102, 200; 345/335

[56] References Cited

U.S. PATENT DOCUMENTS 5,202,984  4/1993  Kashio ........................ 707/200
5,504,676  4/1996  Domen et al. .................... 395/230

*Primary Examiner*—Paul R. Lintz
*Assistant Examiner*—Donald Min
*Attorney, Agent, or Firm*—Frishauf, Holtz, Goodman, Langer & Chick

[57] ABSTRACT

A file update processing apparatus which enables execution of an intended file processing in accordance with the description contents of a correspondence slip and a generation table without requesting a system engineer to design a file processing program when a general person in charge who understands specific items required for a file in execution of daily operations sets predetermined items in the correspondence slip and the generation table so as to match his own business contents. When an original book registration slip, a journalizing table, and an expansion table are input from an input unit, an input processor registers them in correspondence with data files. A file processor generates a record on the basis of items set in the original book registration slip and items generated on the basis of the generation tables and updates the data file on the basis of this record.

3 Claims, 22 Drawing Sheets

FIG.2 ORIGINAL BOOK REGISTRATION SLIP (TRANSFER SCHEDULE)

| | A | B | C | D | E | F | G | H |
|---|---|---|---|---|---|---|---|---|
| 1 | ORIGINAL BOOK NAME | | | | | INPUT ORIGINAL BOOK NAME | TRANSFER SLIP | TRAVELING EXPENSES AND CARFARE WORKING SHEET |
| 2 | TRANSFER SCHEDULE | | | | | BUSINESS NAME | TRANSFER SLIP INPUT | TRAVELING EXPENSES AND CARFARE WORKING SHEET INPUT |
| 3 | | | | | | FUNCTION NAME | SLIP | SLIP |
| 4 | | | | | | UPDATING CLASS | ADDITION | ADDITION |
| 5 | ITEM NAME | ATTRIBUTE | DIGIT COUNT | TABLE NAME | | DEFINITION | SLIP ITEM | SLIP ITEM |
| 6 | TRANSACTION DATE | R | 4 | | | | DIVISION(DATE,1,6) | DIVISION (SETTLEMENT DATE,1,6) |
| 7 | SLIP CLASS | R | 2 | | | | "62" | "63" |
| 8 | SLIP NO. | R | 5 | | | | SLIP NO. | SLIP NO. |
| 9 | TRANSACTION DATE | | 8 | | | | DATE | SETTLEMENT DATE |
| 10 | ISSUING ENTERPRISE cd | | 3 | | | | ISSUING ENTERPRISE | HOME ENTERPRISE |
| 11 | PERSON-IN-CHARGE NO. | | 5 | | | | PERSON-IN-CHARGE NO. | STAFF MEMBER cd |
| 12 | AMOUNT | N | 13.0 | | | | AMOUNT | SETTLEMENT AMOUNT |
| 13 | DEBIT ACCOUNT cd | | 4 | ACCOUNT tb | | | DEBIT ACCOUNT | "4567" |
| 14 | DEBIT BANK cd | | 3 | BANK tb | | | DEBIT BANK | |
| 15 | DEBIT CUSTOMER cd | | 8 | CUSTMER tb | | | DEBIT CUSTOMER | |
| 16 | DEBIT ACCOUNTING cd | | 2 | | | | DEBIT ACCOUNTING | ACCOUNTING cd |
| 17 | DEBIT DEPARTMENT cd | | 3 | | | | DEBIT DEPARTMENT | DEPARTMENT cd |
| 18 | CREDIT ACCOUNT cd | | 4 | ACCOUNT tb | | | CREDIT ACCOUNT | "1111" |
| 19 | CREDIT BANK cd | | 3 | BANK tb | | | CREDIT BANK.cd | |
| 20 | CREDIT CUSTOMER cd | | 8 | CUSTMER tb | | | CREDIT CUSTOMER | |
| 21 | CREDIT ACCOUNTING cd | | 2 | | | | CREDIT ACCOUNTING | ACCOUNTING cd |
| 22 | CREDIT DEPARTMENT cd | | 3 | | | | CREDITOR'S DEPARTMENT | DEPARTMENT cd |
| 23 | PURCHASE DEPARTMENT cd | | 2 | | | | | |
| 24 | RECEIVE/DEBIT DESTINATION cd | | 8 | | | | | STAFF MEMBER cd |
| 25 | RECEIVE/DEBIT DESTINATION NAME | | 20 | | | | | NAME |
| 26 | EXPLANATION | | 40 | | | | EXPLANATION | EXPLANATION |
| 27 | REGISTRATION DATE | | 8 | | #APPOINTED DAY | | | |
| 28 | ISSUING ENTERPRISE NAME | | 20 | | #INDEX (ISSUING ENTERPRISE cd, ENTERPRISE NAME) | | | |
| 29 | DEBIT INTERNAL ACCOUNT cd | | 6 | | #INDEX (ACCOUNT tb, DEBIT ACCOUNT cd, INTERNAL ACCOUNT cd) | | | |
| 30 | CREDIT INTERNAL ACCOUNT cd | | 6 | | #INDEX (ACCOUNT tb, CREDIT ACCOUNT cd, INTERNAL ACCOUNT cd) | | | |

FIG.3

| A | B | C | D | F | G | H | I | J |
|---|---|---|---|---|---|---|---|---|
| ORIGINAL BOOK NAME | | | | INPUT ORIGINAL BOOK NAME | SALES SLIP | PURCHASE SLIP | INTER-WAREHOUSE MOVEMENT SLIP | ADVANCE SLIP |
| SALES SCHEDULE | | | | BUSINESS NAME | SALES SLIP INPUT | PURCHASE SLIP INPUT | WAREHOUSE MOVEMENT INPUT | ADVANCE SLIP INPUT |
| | | | | FUNCTION NAME | SLIP | SLIP | SLIP | SLIP |
| | | | | UPDATING CLASS | ADDITION | ADDITION | ADDITION | ADDITION |
| ITEM NAME | ATTRIBUTE | DIGIT COUNT | TABLE NAME | DEFINITION | SLIP ITEM | SLIP ITEM | SLIP ITEM | SLIP ITEM |
| TRANSACTION DATE | R | 6 | | #DIVISION (TRANSACTION DATE, 1, 6) | | | | |
| TRANSACTION CLASS | R | 2 | | | "20" | "34" | "51" | "53" |
| SLIP NO. | R | 4 | | | SLIP NO. | SLIP NO. | SLIP NO. | SLIP NO. |
| ROW NO. | R | 2 | | | ROW NO. | ROW NO. | ROW NO. | ROW NO. |
| TRANSACTION DATE | R | 8 | | | ISSUANCE DATE | ISSUANCE DATE | ISSUANCE DATE | ADVANCE DATE |
| TRANSACTION ENTERPRISE cd | | 3 | ENTERPRISE tb | | PLACE TO WHICH MEMBER BELONGS | PLACE TO WHICH MEMBER BELONGS | PLACE TO WHICH MEMBER BELONGS | PLACE TO WHICH MEMBER BELONGS |
| PERSON-IN-CHARGE NO. | | 5 | EMPLOYEE tb | | PERSON-IN-CHARGE NO. | PERSON-IN-CHARGE NO. | PERSON-IN-CHARGE NO. | PERSON-IN-CHARGE NO. |
| PERSON-IN-CHARGE NAME | | 20 | | | PERSON-IN-CHARGE NAME | PERSON-IN-CHARGE NAME | PERSON-IN-CHARGE NAME | PERSON-IN-CHARGE NAME |
| CUSTOMER cd | | 8 | CUSTOMER tb | | CUSTOMER CODE | VENDOR CODE | WAREHOUSING DESTINATION CODE | ADVANCE DESTINATION CODE |
| PARTNER ENTERPRISE cd | | 3 | ENTERPRISE tb | | | | | |
| FINISHED GOODS PARTS cd | | 8 | FINISHED GOODS tb | | FINISHED GOODS CODE | FINISHED GOODS CODE | FINISHED GOODS CODE | FINISHED GOODS CODE |
| FINISHED GOODS CONDITION DIVISION | | 1 | | | CONDITION | CONDITION | CONDITION | CONDITION |
| FINISHED GOODS PARTS NAME | | 20 | | | FINISHED GOODS NAME | FINISHED GOODS NAME | FINISHED GOODS NAME | FINISHED GOODS NAME |
| FINISHED GOODS SPECIFICATION NAME | | 20 | | | FINISHED GOODS STANDARDS NAME | FINISHED GOODS STANDARDS NAME | FINISHED GOODS STANDARDS NAME | FINISHED GOODS STANDARDS NAME |
| TRANSACTION DIVISION | | 1 | | | SALES DIVISION | PURCHASE DIVISION | MOVEMENT DIVISION | ADVANCE DIVISION |
| TRANSACTION QUANTITY | N | 9.0 | | | QUANTITY | QUANTITY | QUANTITY | QUANTITY |
| TRANSACTION UNIT PRICE | N | 11.2 | | | UNIT PRICE | UNIT PRICE | | |
| TRANSACTION AMOUNT | N | 13.0 | | | AMOUNT | AMOUNT | | |
| WAREHOUSE cd | | 5 | WAREHOUSE tb | | OUT-OF-STOCK WAREHOUSE | INTO-STOCK WAREHOUSE | INTO-STOCK WAREHOUSE | INTO-STOCK WAREHOUSE |
| PARTNER WAREHOUSE cd | | 5 | WAREHOUSE tb | | | | OUT-OF-STOCK WAREHOUSE | |
| EXPLANATION | | 20 | | | EXPLANATION | EXPLANATION | EXPLANATION | EXPLANATION |
| REGISTRATION DATE | | 8 | | APPOINTED DAY | | | | |
| TRANSACTION ENTERPRISE NAME | | 20 | | #INDEX (TRANSACTION ENTERPRISE cd, ENTERPRISE NAME) | | | | |
| FINISHED GOODS CLASS | | 2 | | #INDEX (FINISHED GOODS cd, FINISHED GOODS CLASS) | | | | |
| FINISHED GOODS MATERIAL COST | N | 11.0 | | #INDEX (FINISHED GOODS UNIT PRICE tbh, FINISHED GOODS cd, MATERIAL COST) | | | | |
| EXPENSES OF PROCESSING ORDERED FOR FINISHED GOODS | N | 11.0 | | #INDEX (FINISHED GOODS UNIT PRICE tbh, FINISHED GOODS cd, EXPENSES OF PROCESSING ORDERED FOR FINISHED GOODS) | | | | |
| EXPECTED COST OF FINISHED GOODS | N | 11.0 | | #INDEX (FINISHED GOODS cd, EXPECTED COST) | | | | |

FIG.4

| | A | B | C | D | E | F | G | H | I | J |
|---|---|---|---|---|---|---|---|---|---|---|
| 1 | ORIGINAL BOOK NAME | | | | | INPUT ORIGINAL BOOK NAME | TRANSFER SCHEDULE | | SALES SCHEDULE | |
| 2 | ACCOUNTING SCHEDULE | | | | | BUSINESS NAME | TRANSFER SCHEDULE POSTING | | SALES SLIP JOURNALIZING | |
| 3 | | | | | | FUNCTION NAME | | | JOURNALIZING | |
| 4 | | | | | | UPDATING CLASS | ADDITION | | ADDITION | |
| 5 | ITEM NAME | ATTRIBUTE | DIGIT COUNT | TABLE NAME | | DEFINITION | DEBIT | CREDIT | DEBIT | CREDIT |
| 6 | TRANSACTION DATE | R | 6 | | | | TRANSACTION DATE | TRANSACTION DATE | TRANSACTION DATE | TRANSACTION DATE |
| 7 | seq | R | 9 | | | SLIP SERIAL NUMBER | | | | |
| 8 | SLIP CLASS | | 2 | | | | SLIP CLASS | SLIP CLASS | SLIP CLASS | SLIP CLASS |
| 9 | SLIP NO. | | 5 | | | | SLIP NO. | SLIP NO. | SLIP NO. | SLIP NO. |
| 10 | TRANSACTION DATE | | 8 | | | | TRANSACTION DATE | TRANSACTION DATE | TRANSACTION DATE | TRANSACTION DATE |
| 11 | ENTERPRISE cd | | 3 | ENTERPRISE tb | | | ISSUING ENTERPRISE cd | ISSUING ENTERPRISE cd | ISSUING ENTERPRISE cd | ISSUING ENTERPRISE cd |
| 12 | ACCOUNT cd | | 4 | ACCOUNT tb | | | DEBIT ACCOUNT cd | CREDIT ACCOUNT cd | DEBIT ACCOUNT cd | CREDIT ACCOUNT cd |
| 13 | PERSON-IN-CHARGE NO. | | 5 | EMPLOYEE tb | | | PERSON-IN-CHARGE NO. | PERSON-IN-CHARGE NO. | PERSON-IN-CHARGE NO. | PERSON-IN-CHARGE NO. |
| 14 | DEBIT/CREDIT DIVISION | | 1 | | | | | | | |
| 15 | DEBIT AMOUNT | N | 13.0 | | | | AMOUNT | 0 | ΦAMOUNT | 0 |
| 16 | CREDIT AMOUNT | N | 13.0 | | | | 0 | AMOUNT | 0 | ΦAMOUNT |
| 17 | MANAGEMENT NO. | | 10 | | | | | | | |
| 18 | EXPLANATION | | 20 | | | | EXPLANATION | EXPLANATION | EXPLANATION | EXPLANATION |
| 19 | ACCOUNTING UNIT | | 2 | ACCOUNTING cdtb | | | DEBIT ACCOUNTING cd | CREDIT ACCOUNTING cd | $DEBIT ACCOUNTING UNIT | $CREDIT ACCOUNTING UNIT |
| 20 | DEPARTMENT cd | | 3 | | | | DEBIT DEPARTMENT cd | CREDIT ACCOUNTING cd | | |
| 21 | BANK cd | | 3 | BANK tb | | | DEBIT BANK cd | CREDIT BANK cd | | |
| 22 | CUSTOMER cd | | 8 | CUSTOMER tb | | | DEBIT CUSTOMER cd | CREDIT CUSTOMER cd | DEBIT CUSTOMER cd | CREDIT CUSTOMER cd |
| 23 | CUSTOMER NAME | | 20 | | | #INDEX (CUSTOMER tb, CUSTOMER cd, CUSTOMER NAME) | | | | |
| 24 | PARTNER ACCOUNT cd | | 4 | ACCOUNT tb | | | CREDIT ACCOUNT cd | DEBIT ACCOUNT cd | | |
| 25 | PARTNER ENTERPRISE cd | | 3 | ENTERPRISE tb | | | ISSUING ENTERPRISE cd | ISSUING ENTERPRISE cd | INTO-STOCK WAREHOUSE | INTO-STOCK WAREHOUSE |
| 26 | PARTNER ACCOUNTING cd | | 2 | ACCOUNTING cdtb | | | CREDIT ACCOUNTING cd | DEBIT ACCOUNTING cd | TRANSACTION ENTERPRISE cd | TRANSACTION ENTERPRISE cd |
| 27 | PARTNER DEPARTMENT cd | | 3 | | | | CREDIT DEPARTMENT cd | DEBIT DEPARTMENT cd | $CREDIT ACCOUNTING UNIT | $DEBIT ACCOUNTING UNIT |
| 28 | PARTNER BANK cd | | 3 | BANK tb | | | CREDIT BANK cd | DEBIT BANK cd | | |
| 29 | PARTNER CUSTOMER cd | | 8 | CUSTOMER tb | | #INDEX (CUSTOMER tb, PARTNER CUSTOMER cd, CUSTOMER NAME) | CREDIT CUSTOMER cd | DEBIT CUSTOMER cd | CUSTOMER cd | CUSTOMER cd |
| 30 | PARTNER CUSTOMER NAME | | 20 | | | | | | | |
| 31 | REGISTRATION DATE | | 8 | | | | REGISTRATION DATE | REGISTRATION DATE | REGISTRATION DATE | REGISTRATION DATE |
| 32 | ENTERPRISE NAME | | 20 | | | #INDEX (ENTERPRISE tb, ENTERPRISE cd, ENTERPRISE NAME) | | | | |
| 33 | PARTNER ENTERPRISE NAME | | 20 | | | #INDEX (ENTERPRISE tb, PARTNER ENTERPRISE cd, ENTERPRISE NAME) | | | | |

FIG.5 JOURNALIZING TABLE (SALES SLIP JOURNALIZING)

| | A | B | C | D | E | F | G | H | I |
|---|---|---|---|---|---|---|---|---|---|
| 1 | | JOURNALIZING TABLE NAME | | | | | | | |
| 2 | | SALES SLIP JOURNALIZING | | | | | | | |
| 3 | | INPUT ORIGINAL BOOK | | | | | | | |
| 4 | | SALES SCHEDULE | | | | | | | |
| 5 | | | | | | OUTPUT ORIGINAL BOOK | | | |
| | | | | | | ACCOUNTING SCHEDULE | | | |
| 6 | SERIAL NUMBER | INPUT CONDITION | | | | GENERATION ITEM | | | |
| | | TRANSACTION CLASS | TRANSACTION DIVISION | CUSTOMER cd | | $DEBIT ACCOUNT cd | $CREDIT ACCOUNT cd | @AMOUNT | |
| 7 | 01 | 20 | 1 | 70002145 | | 1161 | 5221 | TRANSACTION AMOUNT | |
| 8 | 02 | 20 | 2 | 70002145 | | 5221 | 1161 | TRANSACTION AMOUNT*(−1) | |
| 9 | 03 | 20 | 3 | 70002145 | | 5221 | 1161 | TRANSACTION AMOUNT*(−1) | |
| 10 | 04 | 20 | 1 | * | | 1161 | 5111 | TRANSACTION AMOUNT | |
| 11 | 05 | 20 | 2 | * | | 5171 | 1161 | TRANSACTION AMOUNT*(−1) | |
| 12 | 06 | 20 | 3 | * | | 5161 | 1161 | TRANSACTION AMOUNT*(−1) | |
| 13 | 07 | 20 | 6 | * | | 1161 | 5111 | TRANSACTION AMOUNT | |
| 14 | 08 | 20 | 7 | * | | 5171 | 1161 | TRANSACTION AMOUNT*(−1) | |
| 15 | 09 | 20 | 9 | * | | 1161 | 5111 | TRANSACTION AMOUNT | |
| 16 | 10 | 20 | | | | 5111 | 2112 | TRANSACTION AMOUNT | |
| 17 | | TRANSACTION ENTERPRISE cd | WAREHOUSE cd | PARTNER ENTERPRISE cd | PARTNER WAREHOUSE cd | $DEBIT ACCOUNTING cd | $CREDIT ACCOUNTING cd | | |
| 18 | 11 | 600 | * | * | * | 30 | 30 | | |
| 19 | 12 | 8* | | 8* | | #INDEX (WAREHOUSE tb, PARTNER WAREHOUSE cd, ACCOUNTING UNIT) | #INDEX (WAREHOUSE tb, PARTNER WAREHOUSE cd, ACCOUNTING UNIT) | | |
| 20 | 13 | * | 100 | | | #INDEX (ENTERPRISE tb, PARTNER TRANSACTION ENTERPRISE cd, ACCOUNTING UNIT) | #INDEX (ENTERPRISE tb, PARTNER TRANSACTION ENTERPRISE cd, ACCOUNTING UNIT) | | |
| 21 | 14 | * | * | * | 100 | #INDEX (ENTERPRISE tb, PARTNER TRANSACTION ENTERPRISE cd, ACCOUNTING UNIT) | #INDEX (ENTERPRISE tb, PARTNER TRANSACTION ENTERPRISE cd, ACCOUNTING UNIT) | | |
| 22 | | $DEBIT ACCOUNTING cd | | | | $DEBIT ACCOUNTING UNIT | $CREDIT ACCOUNTING UNIT | $DEBIT ACCOUNT | $CREDIT ACCOUNT |
| 23 | 15 | 1 = $CREDIT ACCOUNTING cd | | | | $DEBIT ACCOUNTING cd | $CREDIT ACCOUNTING cd | $DEBIT ACCOUNT cd | 4600 |
| 24 | 16 | | | | | $DEBIT ACCOUNTING cd | $CREDIT ACCOUNTING cd | 4600 | $CREDIT ACCOUNT cd |
| 25 | 17 | $CREDIT ACCOUNTING cd | | | | $DEBIT ACCOUNTING cd | $CREDIT ACCOUNTING cd | $DEBIT ACCOUNT cd | $CREDIT ACCOUNT cd |

FIG.6

EXPANSION TABLE (TABLE ①)

| INPUT ORIGINAL BOOK NAME | FINISHED GOODS FILE | OUTPUT ORIGINAL BOOK NAME | FINISHED GOODS CONSTITUTION FILE | | |
|---|---|---|---|---|---|
| PARTS NAME | PARTS FILE | | | | |
| INPUT COLLATION KEY | PARENT NAME | | | | |
| INPUT CONDITION | | | GENERATION ITEM | | |
| | | $PARENT CODE | $CHILD CODE | @PREDETERMINED COUNT | @UNIT PRICE | @AMOUNT |
| | | PARENT NAME | CHILD NAME | USE COUNT * PREDETERMINED COUNT | UNIT PRICE | UNIT PRICE * PREDETERMINED COUNT |

FIG.7

ORIGINAL BOOK REGISTRATION TABLE
FOR OUTPUT ORIGINAL BOOK
(FINISHED GOODS CONSTITUTION FILE)

| ORIGINAL BOOK NAME | | | | INPUT ORIGINAL BOOK NAME | FINISHED GOODS FILE |
|---|---|---|---|---|---|
| FINISHED GOODS CONSTITUTION FILE | | | | BUSINESS NAME | TABLE ① |
| | | | | FUNCTION NAME | PARTS EXPANSION |
| | | | | UPDATING CLASS | ADDITION |
| ITEM NAME | ATTRI-BUTE | DIGIT COUNT | TABLE NAME | DEFINITION | INPUT ITEM CONTENTS |
| FINISHED GOODS NAME | R | 50 | | | PARENT NAME |
| PARENT NAME | R | 50 | | | $PARENT CODE |
| CHILD NAME | R | 50 | | | $CHILD CODE |
| LEVEL | C | 10 | | | $LEVEL |
| USE COUNT | N | 10 | | | @PREDE-TERMINED COUNT |
| UNIT PRICE | N | 10 | | | @UNIT PRICE (ROUND TO NEAREST) |
| AMOUNT | N | 10 | | | @AMOUNT (ROUND TO NEAREST) |

FIG.8

INPUT ORIGINAL BOOK (FINISHED GOODS FILE) SERVING AS ROOT

| PARENT NAME | PREDETERMINED COUNT |
|---|---|
| A | 1 |
| B | 1 |

FIG.9

PARTS FILE REPRESENTING PARENT-CHILD RELATIONSHIP

| PARENT NAME | CHILD NAME | USE COUNT | UNIT PRICE |
|---|---|---|---|
| A | a | 1 | 0 |
| A | b | 1 | 10 |
| A | c | 1 | 0 |
| a | i | 1 | 10 |
| a | ii | 2 | 10 |
| a | iii | 3 | 10 |
| c | iv | 4 | 10.10 |
| c | v | 5 | 10.08 |
| B | d | 2 | 0 |
| B | e | 3 | 0 |
| B | f | 4 | 0 |
| d | vi | 1 | 10 |
| d | vii | 2 | 10 |
| e | viii | 3 | 10 |
| f | ix | 4 | 10 |
| f | x | 5 | 10 |

TREE STRUCTURE REPRESENTING
PARENT-CHILD RELATIONSHIP

FIG.18

| RECORD NUMBER | TRANS-ACTION CLASS | TRANS-ACTION DIVISION | CUSTOMER cd | TRANS-ACTION ENTER-PRISE cd | WARE-HOUSE cd | PARTNER ENTER-PRISE cd | PARTNER WARE-HOUSE cd | TRANS-ACTION AMOUNT |
|---|---|---|---|---|---|---|---|---|
| 1 | 20 | 3 | 70002145 | 600 | 600 | 400 | 400 | 12,000 |
| 2 | 20 | 9 | 00000000 | 821 | 801 | 821 | 400 | 4,000 |

FIG.19

GENERATION ITEMS

| RECORD NUMBER | $DEBIT ACCOUNT cd | $CREDIT ACCOUNT cd | $DEBIT ACCOUNT-ING cd | $DEBIT ACCOUNT-ING cd | $DEBIT ACCOUNT | $CREDIT ACCOUNT | $DEBIT ACCOUNT-ING UNIT | $DEBIT ACCOUNT-ING UNIT |
|---|---|---|---|---|---|---|---|---|
| 1 | 5221 | 1161 | 30 | 30 | 5221 | 1161 | 30 | 30 |
| 2 | 1161 | 5111 | 20 | 40 | 1161 | 4600 | 20 | 20 |
| 2 | 1161 | 5111 | 20 | 40 | 4600 | 1161 | 40 | 40 |
| 2 | 5111 | 2112 | 20 | 40 | 5111 | 4600 | 20 | 20 |
| 2 | 5111 | 2112 | 20 | 40 | 4600 | 5111 | 40 | 40 |

FIG.20
OUTPUT ORIGINAL BOOK

| RECORD NUMBER | BLOCK 1 | BLOCK 2 | BLOCK 3 | | ACCOUNT cd | ACCOUNT-ING UNIT | PARTNER ACCOUNT cd | PARTNER ACCOUNT-ING UNIT | DEBIT AMOUNT | CREDIT AMOUNT |
|---|---|---|---|---|---|---|---|---|---|---|
| 1 | 03 | 11 | 17 | OUTPUT 01 | 5221 | 30 | 1161 | 30 | 12,000 | 0 |
| | | | | OUTPUT 02 | 1161 | 30 | 5221 | 30 | 0 | 12,000 |
| | | 12 | 15 | OUTPUT 03 | 1161 | 20 | 4600 | 20 | 4,000 | 0 |
| | | | | OUTPUT 04 | 4600 | 20 | 1161 | 20 | 0 | 4,000 |
| 2 | 09 | | 16 | OUTPUT 05 | 4600 | 40 | 5111 | 40 | 4,000 | 0 |
| | | | | OUTPUT 06 | 5111 | 40 | 4600 | 40 | 0 | 4,000 |
| | 10 | | 15 | OUTPUT 07 | 5111 | 20 | 4600 | 20 | 4,000 | 0 |
| | | | | OUTPUT 08 | 4600 | 20 | 5111 | 20 | 0 | 4,000 |
| | | | 16 | OUTPUT 09 | 4600 | 40 | 2112 | 40 | 4,000 | 0 |
| | | | | OUTPUT 10 | 2112 | 40 | 4600 | 40 | 0 | 4,000 |

INTERMEDIATE FILE

| $PARENT CODE | $CHILD CODE | $LEVEL | @PREDE-TERMINED COUNT | @UNIT PRICE | @AMOUNT |
|---|---|---|---|---|---|
|  | A | 0 | 1 | 0 | 0 |
| A | a | 1 | 1 | 0 | 0 |
| A | b | 1 | 1 | 10 | 10 |
| A | c | 1 | 1 | 0 | 0 |
| a | i | 2 | 1 | 10 | 10 |
| a | ii | 2 | 2 | 10 | 20 |
| a | iii | 2 | 3 | 10 | 30 |
| c | iv | 2 | 4 | 10.10 | 40.40 |
| c | v | 2 | 5 | 10.08 | 50.40 |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |

SORTED INTERMEDIATE FILE

| $PARENT CODE | $CHILD CODE | $LEVEL | @PREDE-TERMINED COUNT | @UNIT PRICE | @AMOUNT | |
|---|---|---|---|---|---|---|
|  | A | 0 | 1 | 160 | 160.80 | ← INFORMATION OF ROOT A |
| A | a | 1 | 1 | 60 | 60 | |
| a | i | 2 | 1 | 10 | 10 | |
| a | ii | 2 | 2 | 10 | 20 | |
| a | iii | 2 | 3 | 10 | 30 | |
| A | b | 1 | 1 | 10 | 10 | |
| A | c | 1 | 1 | 90 | 90.80 | |
| c | iv | 2 | 4 | 10.10 | 40.40 | |
| c | v | 2 | 5 | 10.08 | 50.40 | |
|  | B | 0 | 1 | 510 | 510 | ← INFORMATION OF ROOT B |
| B | d | 1 | 2 | 30 | 60 | |
| d | vi | 2 | 2 | 10 | 20 | |
| d | vii | 2 | 4 | 10 | 40 | |
| B | e | 1 | 3 | 30 | 90 | |
| e | viii | 2 | 9 | 10 | 90 | |
| B | f | 1 | 4 | 90 | 360 | |
| f | ix | 2 | 16 | 10 | 160 | |
| f | x | 2 | 20 | 10 | 200 | |

DATA FILE UPDATE PROCESSING APPARATUS

BACKGROUND OF THE INVENTION

1. Field of the Invention

The present invention relates to a data processing apparatus for executing data update processing on the basis of a variety of business processing files in an office computer, a personal computer, a host computer, or the like.

2. Description of the Related Art

In a conventional data processing apparatus for executing business processing such as an office computer, a variety of files such as sales files, accounting files, transfer files, and personnel files are stored and managed. In this case, record structures constituting data files are different in units of data files. Identical record forms (i.e., records having identical constituent items) are stored and managed as an independent file.

In a sales file, sales slips, purchase slips, and the like are input to perform record updating, i.e., record totalization, record addition, and the like. These updating operations can be performed such that an expert such as a system engineer designs respective slip input processing programs in advance to allow processing for a predetermined file.

In the conventional data processing apparatus, the individual processing programs corresponding to the individual slip input processing and file processing must be designed in accordance with the business contents of end users. However, the processing programs become unsuitable for actual business operations because they change over time. File processing matching the actual business contents may not be performed.

In this case, part of each processing program must be changed to cope with the actual business operation in the conventional data processing apparatus, but such a change is a very expert operation and requires special knowledge such as programming. Thus, the user must request the system engineer to change the conventional processing program. A similar situation also exists with respect to designing a new program.

In addition, a general person in charge as an end user knows the slip names, slip items, or business system that are used in daily operations, but cannot accurately recognize the specific types of data files currently stored and managed in the data processing apparatus, the specific record forms of the data files, and the specific items for specific records of a specific file in accordance with even the daily operations.

When a person in charge is to execute operations for sales management, personnel management, and the like, he empirically understands that a specific business management operation requires specific items in accordance with the execution of daily operations. For example, pieces of information (item) such as a finished goods name, a finished goods number, an amount, a quantity, and a unit price are required in sales management. Items such as the names of employees, staff member numbers, ages, and family makeups are required in personnel management. That is, he must understand what is to be managed as files and the management items required in units of management objects. On the basis of such knowledge, systematic business management is generally performed.

SUMMARY OF THE INVENTION

It is an object of the present invention to execute update processing of a data file in an intended manner in accordance with a predetermined correspondence slip without requesting design of a processing program for processing the data file to a system engineer having expert knowledge such as programming when a general person in charge who empirically understands the required items for the file in execution of daily operations describes, in the predetermined correspondence slip, a correspondence between the data file and a processing target file subjected to a processing target in updating records of this data file, so as to match his own business contents; and to execute update processing of the data file on the basis of necessary item data generated on the basis of condition items such that an arbitrary item in records constituting a processing target file and an item generated as the condition item corresponding to the arbitrary item are described in a generation table, and the generation table is registered in correspondence with the correspondence slip.

It is another object of the present invention to execute update processing of a data file in an intended manner in accordance with the description contents of a correspondence slip when a general person in charge describes, in the correspondence slip, a correspondence between the data file and a processing target file serving as a processing target in updating the records of this data file so as to match his business contents; and to selectively execute whether file processing is activated by batch activation on the basis of all the processing target files or file processing is activated on the basis of an arbitrarily designated processing target file when a plurality of processing target files are set in the correspondence table.

To achieve the above object, according to the present invention, there is provided a data file update processing apparatus comprising: first input means for inputting a correspondence slip for setting, in correspondence, each item corresponding to a record arrangement of a data file and an item of a processing target file serving as a processing target in updating a record of the data file; second input means for inputting a generation table for setting an arbitrary item of a record constituting the processing target file set in the correspondence slip and a generation item generated using the arbitrary item as a condition item; table storage means for storing, in correspondence, the correspondence slip input from the first input means and the generation table input from the second input means; item data generation means for generating item data corresponding to a record item of the data file set in correspondence slip on the basis of the item of the processing target file set in the generation table in the table storage means; record generation means for generating a record corresponding to the record arrangement of the data file in the correspondence slip on the basis of the item data corresponding to the item of the processing target file set in the correspondence slip in the table storage means and the item data generated by the item data generation means; and updating means for updating the data file in the correspondence slip on the basis of the record generated by the record generation means.

Update processing of a data file can be executed in an intended manner in accordance with a predetermined correspondence slip without requesting design of a processing program for processing the data file to a system engineer having expert knowledge such as programming when a general person in charge who empirically understands the required items for the file in execution of daily operations describes, in the predetermined correspondence slip, a correspondence between the data file and a processing target file subjected to a processing target in updating records of this data file, so as to match his own business contents; and update processing of the data file on the basis of necessary item data generated on the basis of condition items such that an arbitrary item in records constituting a processing target file and an item generated as the condition item corresponding to the arbitrary item are described in a generation table, and the generation table is registered in correspondence with the correspondence slip.

In addition, update processing of a data file can be executed in an intended manner in accordance with the description contents of a correspondence slip when a general person in charge describes, in the correspondence slip, a correspondence between the data file and a processing target file serving as a processing target in updating the records of this data file so as to match his business contents; and whether file processing is activated by batch activation on the basis of all the processing target files or file processing is activated on the basis of an arbitrarily designated processing target file can be selectively executed when a plurality of processing target files are set in the correspondence table.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 is a view showing an original book registration slip corresponding to a transfer schedule file;

FIG. 3 is a view showing an original book registration slip corresponding to a sales schedule file;

FIG. 4 is a view showing an original book registration slip corresponding to an accounting schedule file;

FIG. 5 is a view showing a sales slip journalizing table;

FIG. 6 is a view showing an expansion slip;

FIG. 7 is a view showing an original book registration slip registered in correspondence with the expansion slip shown in FIG. 6;

FIG. 8 is a view showing the arrangement of a finished goods file defined as "input original book" in the expansion slip shown in FIG. 6;

FIG. 9 is a view showing the arrangement of a parts file defined as "parts name" in the expansion slip shown in FIG. 6;

FIG. 18 is a detailed view showing part of the input original book so as to explain the journalizing process;

FIG. 19 is a detailed view showing generation items to be generated in the journalizing process;

FIG. 20 is a detailed view showing part of an output original book when the output original book is updated on the basis of a record generated in the journalizing process;

FIG. 22 is a view showing the contents of the intermediate file after the contents of the intermediate file in FIG. 21 are sorted in correspondence with a hierarchical structure.

DETAILED DESCRIPTION OF THE PREFERRED EMBODIMENT

Figure 1:
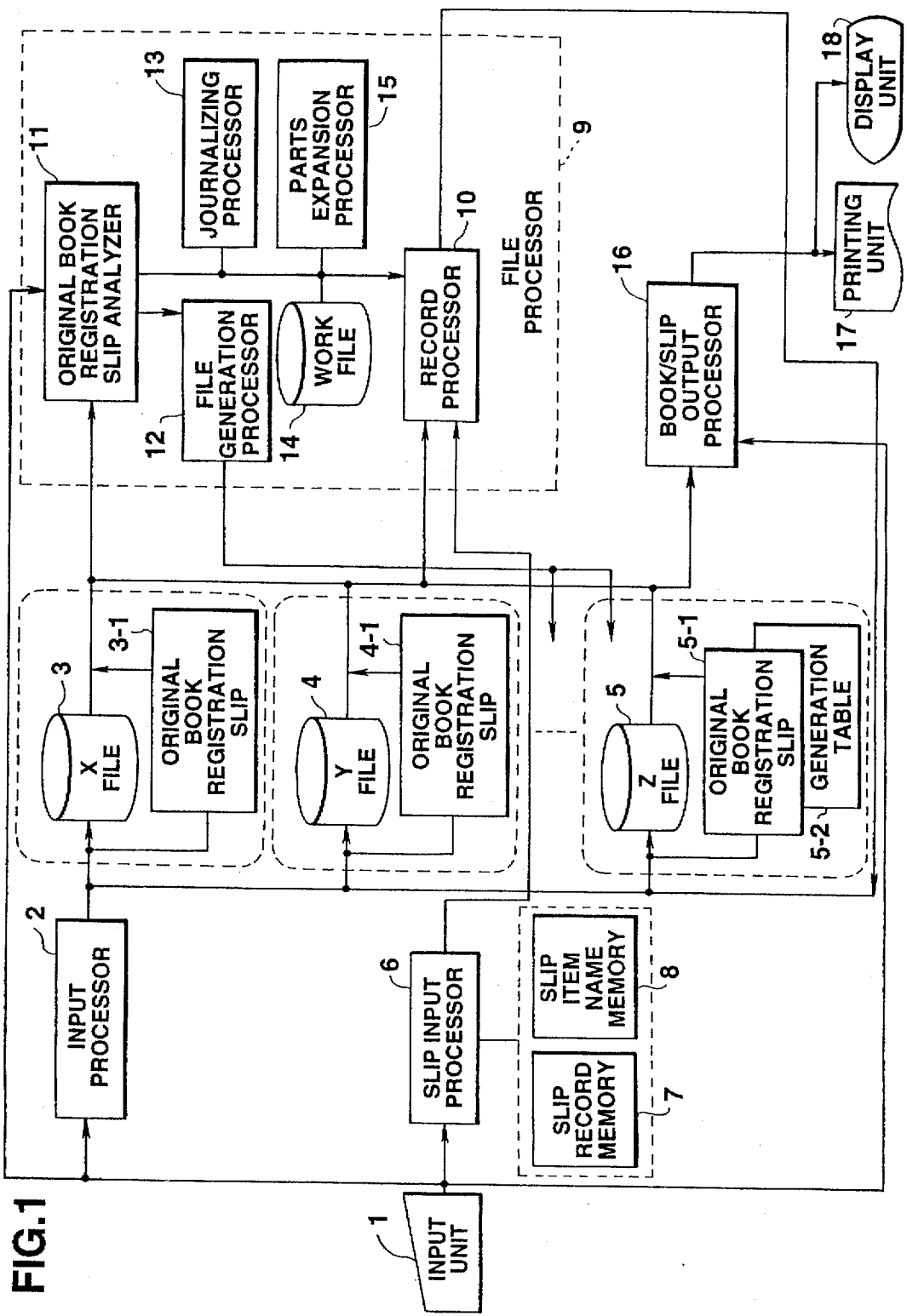
FIG. 1 is a block diagram showing the overall arrangement of a data processing apparatus.

FIG. 1 is a block diagram showing the overall arrangement of an office computer or the like.

An input unit 1 includes a key input device for inputting various data and commands with keys and a mouse serving as a pointing device. When an input of an original book registration slip is designated from this input unit 1, an input processor 2 is activated in accordance with this instruction and executes the input process of the original book registration slip input from the input unit 1.

The original book registration slip will be described below. FIGS. 2 to 4 show detailed original book registration slips, respectively. FIG. 2 shows an original book registration slip for transfer schedule file, FIG. 3 shows an original book registration slip for sales schedule file, and FIG. 4 shows an original book registration file for accounting schedule file. In this embodiment, X, Y, and Z files 3, 4, and 5 and the like are prepared for various data files such as transfer schedule files, sales schedule files, and accounting schedule files. Original book registration slips 3-1, 4-1, 5-1, . . . are stored and managed in correspondence with these files. The slip forms of the respective slips are basically identical to each other.

The basic arrangement of each of the original book registration slips shown in FIGS. 2 and 3 constitutes a correspondence slip between each item name in correspondence with the record arrangement of a data file and each item name of at least one slip serving as a processing target for updating the record of this data file. The basic arrangement of the original book registration slip shown in FIG. 4 constitutes a correspondence slip for establishing a correspondence between each item name in correspondence with the record arrangement of a data file and each item name in correspondence with the record arrangement of at least one processing target file serving as a processing target for updating the record of this data file.

First of all, referring to FIG. 2, letters A, B, C, . . . horizontally written outside the frame of the original book registration slip represent column item positions of the registration slip consisting of a table form having rows and columns. Numbers 1, 2, 3, . . . vertically written outside the frame represent row item positions. The rules lines and captions (e.g., original book name, item name, attribute, ..., input original book name, business name, ...) constituting a table frame and cell frames are included in a slip form preset in the registration slip input processor 2. In a state wherein this slip form is output on the display screen, data are sequentially input while designating arbitrary item positions at the input unit 1.

More specifically, file name "transfer schedule" of a transfer schedule file is input in correspondence with slip form caption "original book name". Item names (transaction date, slip classes, slip No., transaction date, issuing enterprise cd, ...) are input one by one in correspondence with the record arrangement of the transfer schedule file. Note that "cd" represents a cord, and "slip No." represents a sequential slip number. Predetermined items are input one by one in the columns of "attribute", "digit count", "table name", and "definition" in correspondence with each item name. In this case, "attribute" represents an attribute of a corresponding item. For example, "R" represents right justification, and "N" represents a numerical value. "Digit count" represents the number of digit positions of the corresponding item. "Table name" represents the name of index table to be referred to in generation of data of the corresponding item. For example, "debit bank cd" represents that an index table represented by the corresponding table name "bank td" is referred to convert the code into characters, thereby generating the corresponding item data. "Definition" represents a definition for a generation condition for generating data of the corresponding item with reference to an index table or the like as needed. For example, the definition "#appointed day" corresponding to "registration date" indicates that the current date on which a file is registered should be defined as a registration date.

Note that the description contents of "attribute", "digit count", "table name", and "definition" are referred to when this transfer schedule file is to be output as a book/slip. Among these items, the column of "definition" is also referred to when a slip item to be described later is to be generated.

On the other hand, in the original book registration slip shown in FIG. 2, each slip name "transfer slip", "traveling expenses and carfare working sheet" are input in correspondence with the caption "input original book name". This slip is a slip serving as a processing target in updating the record of a transfer schedule file. When a plurality of slips having the same slip name are present, a slip name serving as a concept of lower rank is input for each slip in correspondence with the caption "business name" for distinguishing the slips having the same slip name. That is, "business name" is a column for setting a slip name of a concept of lower rank. The same name as in "input original name" may be input.

When a processing target is a slip or file, "function name" is set to determine whether a special process (a journalizing process and a parts expansion process, both of which will be described later) is required. If the processing target is a slip, "slip" is input in the column of "function name". If a special process is required, "journalizing" or "parts expansion" is input in the column of "function name". "Updating classes" represent updating classes in updating the records of the transfer schedule file. For example, an arbitrary updating class is selected for each slip from record totalization, record addition, record addition/totalization, and the like. In the illustrated example, "addition" representing the record addition is input as the updating class for "transfer slip" and "traveling expenses and carfare working sheet".

Slip item names constituting a slip are input one by one in correspondence with the record item name of the data file. More specifically, each item name ("division (date, 1,6), "62", slip No., date, issuing enterprise, ...) of the transfer slip is input in correspondence with the record item name of the transfer schedule file. Similarly, the item names "#division (date, 1,6), #63", slip No., settlement date, home enterprise ..." of the slip for the traveling expenses and carfare working sheet are input in correspondence with the record item names of the transfer schedule file 3 in correspondence with the slip for the traveling expenses and carfare working sheet.

The slip item name "#division (date, 1,6)" indicates to dividedly extract year and month data of the first digit position to the sixth digit position of the 8-digit date data. The slip item names "62", "63", and the like indicate eigenvalues (slip classes). "slip items" are respectively input as captions in the Gth and Hth columns of the fifth row of the original book registration slip 3-1 so as to indicate that the data input to each row of the same column is the slip item name.

When the columns of slip item names are blank, and record generation conditions are described in the columns of "definitions" at the corresponding item positions, i.e., when the items are present as data file record items but not as slip items, and particularly, these item data are to be generated, slip item data are to be generated in accordance with the description contents of "definitions".

The contents from row item position "28" of the original book registration slip in FIG. 2 represent items required for outputting the contents of the transfer schedule file 3 as a book/slip. The arrangement is different from the record arrangement of the transfer schedule file with respect to the boundary of horizontal double line in FIG. 2, and necessary items are input in the columns of "item name", "attribute", "table name", and "definition". "#index (issuing enterprise cd, enterprise name)" in the column of "definition" indicates that an issuing enterprise table is retrieved using "issuing enterprise code", reading out an enterprise name from this table, and generating it.

In the original book registration slip corresponding to the sales schedule file, as shown in FIG. 3, the record item names of the data file are caused to correspond to the item names of each type of slip, as in the original book registration slip in FIG. 2. In this case, data file is a sales schedule file, and target slips are "sales slip", "purchase slip", "interwarehouse movement slip", and "credit slip". The records of the sales schedule file are to be updated on the basis of these four types of slips.

As shown in FIG. 4, the original book registration slip corresponding to the accounting schedule file causes record item names of the two data files to correspond to each other. Data files serving as the processing target in updating the record of the accounting schedule file are a transfer schedule file or a sales schedule file. In this case, the record item names of the accounting schedule file are caused to correspond to the record item names of the transfer and sales schedule files. Item names for both "debit" and "credit" sides are input for the records of the sales schedule file.

In this case, "journalizing" is set in the original book registration slip as "function name" of the sales schedule file. This "journalizing" indicates that item data are to be generated with reference to a journalizing table shown in FIG. 5 for items such as "$credit account" affixed with "$" and "@amount" affixed with "@" in the slip item names set in the original book registration slip. That is, even if an item is not present in a data file set as the input original book in the original book registration slip, the data of the corresponding item can be automatically generated on the basis of the journalizing table, provided that "$" or "@" is added to this item name and set in the original book registration slip.

The journalizing table will be described in detail with reference to FIG. 5. FIG. 5 shows a sales slip journalizing table. As shown in FIG. 4, when "journalizing" is set in the function name of the original book registration slip, the sales slip journalizing table is formed in correspondence with this original book registration slip. Note that the generation table 5-2 is input and created in correspondence with the original book registration slip 5-1 of the Z file 5 in FIG. 1. This generation table is not limited to the journalizing table, but may be an expansion table to be described later.

In the journalizing table shown in FIG. 5, letters A, B, C, . . . listed outside the table frame in the horizontal direction represent the column item positions in the row-column form. Numbers 1, 2, 3, . . . listed outside the table frame in the vertical direction represent the row item positions of the entire table. The table frame, cell frames, thick lines, double ruled lines, and captions (e.g., the journalizing table name, input original book, output original book, input conditions, generation items, and serial number, all of which are represented by bold characters) constitute the table form of the journalizing table 5-2. In a state wherein this table form is output on the display screen, desired data are sequentially input while designating arbitrary item positions at the input unit 1. In this case, the journalizing table shown in FIG. 5 is divided into three blocks at double-line boundaries. Data of necessary items for each block are sequentially input. Note that "serial number" indicates a sequential number for data input row constituting each block. The captions such as "input original book" and "output original book" are automatically input upon reading out the contents of the original book registration slip in FIG. 4.

The description contents of each block constituting the journalizing table shown in FIG. 5 will be described below.

Item names such as "transaction class", "transaction division", and "customer cd (code)", i.e., the items in the record constituting the sales schedule file, arbitrarily selected from the item names listed in the original book registration slip shown in FIG. 3 are set in the input condition filling columns of the first column, i.e., a column corresponding to serial numbers "01" to "10" in correspondence with the caption "input conditions". The item names such as "$debit account cd", "$credit account cd", "@amount" arbitrarily selected from the item names of the sales schedule file set as the input original book in the original book registration slip in FIG. 4 are set in correspondence with the caption "generation items". The item contents (condition values) are input in correspondence with the input condition items in the data filling columns of the respective rows corresponding to the serial numbers "01" to "10", and the item contents are input in correspondence with the generation items therein.

Assume that one record is read out from the sales schedule file set as the input original book in the original book registration slip (FIG. 4) corresponding to the journalizing table (FIG. 5). In this case, when the record item values corresponding to the condition items selected from the items in this record and set as "input conditions" in the journalizing table coincide with all the condition item values of the identical rows set in the journalizing table, values corresponding to the set contents of the respective generation items set in the identical rows are read out from the journalizing table, thereby generating the item data corresponding to the respective generation items.

A description "transaction amount*(−1)" corresponding to the generation item "@amount" is a calculation formula for converting the transaction amount into a negative value. Arbitrary calculation formulas may be set for other generation items. When a calculation formula is set in correspondence with each generation item, item data obtained upon execution of this calculation formula can serve as item data of the corresponding generation item. The columns of the input conditions represented by the serial numbers "09" and "10" are not divided by cell frames. Condition item values are described in the row corresponding to the serial number "09", and condition item values are omitted in the row represented by the serial number "10". This indicates that the condition item value of serial number "10" is the same as that of serial number "09". That is, two-record generation items are caused to correspond to each other under the same conditions in the serial numbers "09" and "10". This indicates that the two-record generation items should be generated under the same input condition. Journalizing for generating generation items of a plurality of records under the same input condition is called "multiple journalizing".

In the second block of the journalizing table (FIG. 5), e.g., the intermediate block divided by the thick lines and double lines, a correspondence between the input condition items and the generation items is set as in the first block. In this case, "#index (warehouse tb, warehouse cd, accounting unit)" in the description contents of the generation items indicates that a warehouse table is retrieved using the item of "warehouse code", the accounting unit is read out from this table, and the accounting unit is generated as a generation item.

When item data in one record read out from the sales schedule file has an input condition coinciding with that set in the first block and also with that set in the next block, i.e., when a record has an item satisfying the input conditions of a plurality of blocks, item data is also generated on the basis of a generation item coinciding with the input condition for each block. The item data generated respectively corresponding to a plurality of types of input conditions serve as item data incorporated in one record. This journalizing is called "composite journalizing" hereinafter.

In the last block of the journalizing table (FIG. 5), i.e., a block below the double line, unlike in the first and intermediate blocks, input conditions are not item data of the record constituting the sales schedule file. The input conditions of the last block are generation items of the intermediate block. That is, the input condition of the last block is to determine whether "$debit accounting cd" and "$credit accounting cd" as the generation items of the intermediate block coincide with each other. In FIG. 5, "!=$credit accounting cd" indicates a noncoincidence between "$debit accounting cd" and "$credit accounting cd". "$credit accounting cd" indicates a coincidence. Journalizing using the generation items generated in a given block as the input conditions of the next block is called "transfer journalizing" hereinafter.

An input condition is described in the serial number "15", but no input condition is described in the serial number "16". In this case, a relationship between the serial numbers "09" and "10" of the first block is established. This indicates "multiple journalizing" in which the generation items of a plurality of records are corresponded under the same input condition.

In the journalizing table shown in FIG. 5, "$debit accounting unit", "$credit accounting unit", "$debit account", and "$credit account" are set as the item names for the generation items of the last block. Generation contents generated in correspondence with these item names are the generation items "$debit accounting cd" and "$credit accounting cd" generated in the intermediate block, and the generation items "$debit account cd" and "$credit account cd" and the eigenvalue #"4600" generated in the first block.

In addition, various codes described in the journalizing table have the following meanings. For example, "transaction classes" are "10: transfer slip", "20: sales slip", "30: purchase slip", and "40: movement slip". "Transaction divisions" are "1: sales", "2: return of merchandise", "3: purchases allowances", "6: direct delivery sales", and "7: return of defective merchandise". "Account titles" are "1161: accounts receivable", "5111: finished goods sales", "5161: sales discount", "5171: sales return", and "5222: service sales".

"*" in the description of the input conditions indicates that a numerical value is not specified. Note that "8*" in the intermediate block indicates that the third digit is "8", and digits at the first and second digit positions are not specified.

An expansion table as another generation table will be described below.

FIG. 6 shows a detailed expansion table. When "parts expansion" is set in the function name of the original book registration slip in FIG. 7, the expansion table is registered in correspondence with this original book registration slip. Referring to FIG. 7, in the header area of the original book registration slip, "finished goods constitution file" is set as the original book name, "finished goods file" is set as the input original book name, an expansion table name "table" is set as the business name, "parts expansion" is set as the function name, and "addition" is set as the updating class. As in each original book registration slip described above, in the original book registration slip shown in FIG. 7, a correspondence between the items and item names of the finished goods file is set in correspondence with the record arrangement of the finished goods constitution file. As in the journalizing table described above, item names affixed with "@" and "$" are generation items, respectively.

The table form of the expansion table is basically the same as that of the journalizing table. That is, the captions of the expansion table are "input original book", "output original book", "parts name", "input collation key", "input condition", and "generation item". Of these captions, the column of "input condition" is not used in the expansion table shown in FIG. 6. A data file name arbitrarily input from the input unit 1 is set in the filling column of "parts name". In the example of FIG. 6, the name of "parts file" is set in this filling column. An arbitrary item of one record constituting the input original book (finished goods file) is set as a condition item. In the example of FIG. 6, "parent name" is set in this condition item. The above parts file is retrieved using this condition item as a key.

FIG. 8 shows the arrangement of a finished goods file as an input original book. This record has item data having item names "parent name" and "predetermined count". This finished goods file has a 2-record file arrangement. Note that "parent name" for the finished goods file is its finished goods name, and "predetermined count" is the predetermined number of finished goods. The predetermined count for finished goods having the parent name "A" is "1", and the predetermined count for finished goods having the parent name "B" is "1".

FIG. 9 shows the arrangement of a parts file. This parts file is a conceptual file corresponding to the finished goods file.

This parts file is a data file for storing a record, in units of parts, representing specific names of parts and their quantities, and their unit prices in correspondence with each finished goods defined as the parent name in the finished goods file. The records constituting the parts file have a hierarchical structure representing a parent-child relationship. The items of records constituting the parts file are "parent name", "child name", "use count", and "unit price".

Figure 10:
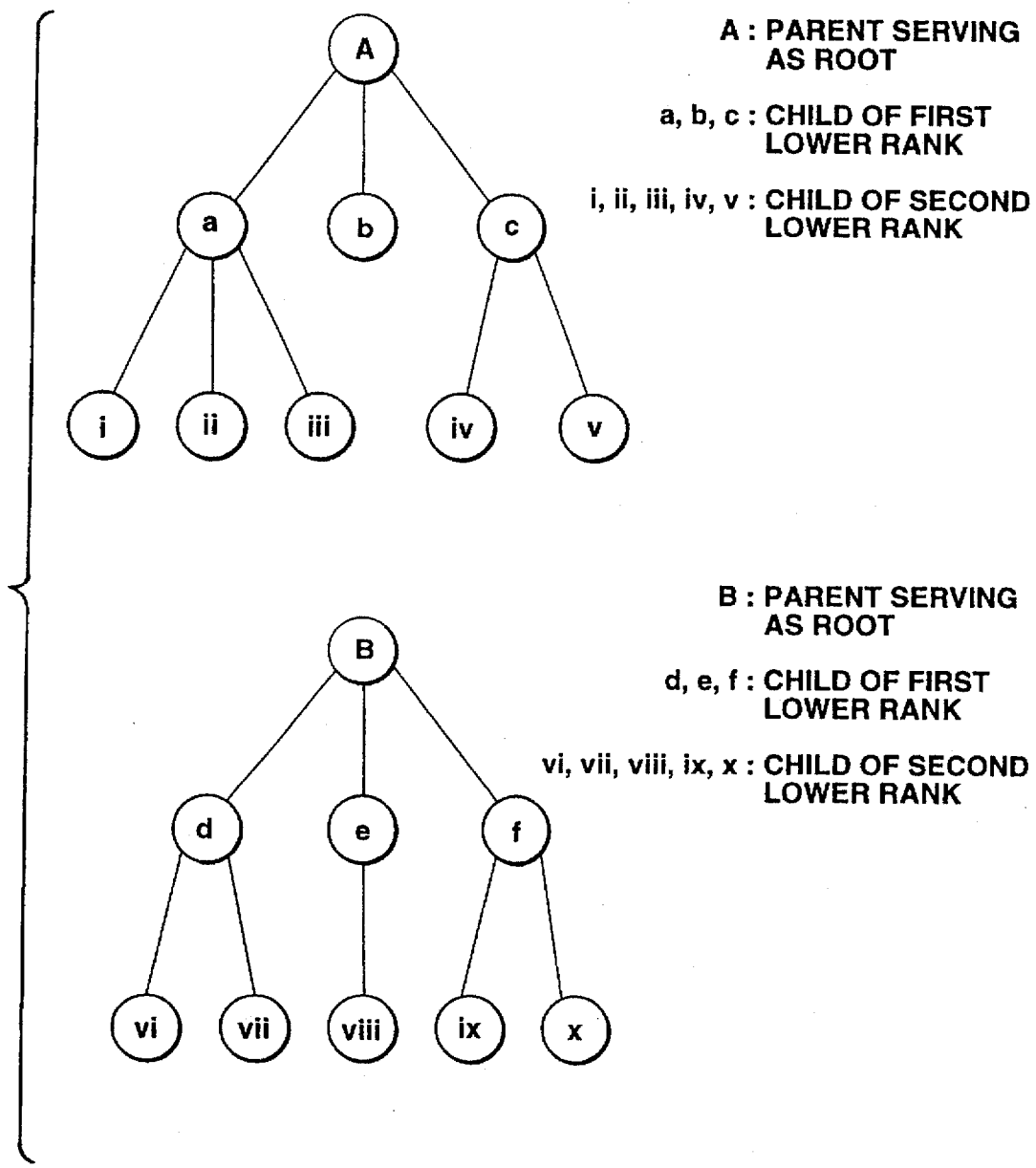
FIG. 10 illustrates the hierarchical structures representing the parent-child relationship of each record of the parts file shown in FIG. 9, the hierarchical structures being a hierarchical structure (1) of parent A serving as a root and a hierarchical structure (2) of parent B serving as a root.

FIG. 10 shows tree structures each representing the parent-child relationship of this parts file. More specifically, parent A serving as a root has children a, b, and c of first lower rank. Parent A serving as the root has children i, ii, iii, iv, and v of second lower rank. Parent B serving as a root has children d, e, and f of first lower rank. Parent B serving as the root has children vi, vii, viii, ix, and x of second lower rank. In the parts file shown in FIG. 9, the first through third records are records for children "a", "b", and "c" of parent "A", while the fourth through sixth records are records of children "i", "ii", "iii" of parent "a". The unit price of parent "a" or "c" having children can be obtained by calculating the sum of the unit prices of these children. The unit price of parent "a" or "c" is set to "0".

The filling column of "generation item" has a two-stage arrangement. In the upper stage, the item name of each generation item is set. In the lower stage, the item contents of this generation item are set. More specifically, of all the item names of the input original book set in the original book registration slip shown in FIG. 7, item names "$parent code", "$b code", "@predetermined count", "@unit price", and "@amount" are set in the upper stage of the filling column of "generation item". A record item name constituting the parts file is set as the item contents of the generation item in the lower stage of the filling column of "generation item". A name with ":" represents the record item name of the parts file. In the expansion table shown in FIG. 6, "parent name" is set as the item contents corresponding to the generation item name "$parent code", "child name" is set as the item contents corresponding to "$child code", and "unit price" is set as the item contents corresponding to "@unit price". These item contents are obtained when the record item names of the parts file are directly set. In addition, "use count*predetermined count" is described as the item contents corresponding to another generation item name "@predetermined count". This is a calculation formula for multiplying the item data "use count" of the parts file with the item data "predetermined count" of the finished goods file. A value obtained by this calculation formula is defined as the generation item "@predetermined count". Furthermore, "unit price*predetermined count" is described as the item contents corresponding to the generation item name "@unit price". This is a calculation formula for multiplying the generation item "@unit price" with the generation item "predetermined count". A value obtained by this calculation formula is defined as the generation item "@amount".

In the expansion table shown in FIG. 6, "table" described above outside the frame represents a name uniquely assigned to this expansion table.

On the other hand, when a transfer slip or a slip record such as a traveling expenses and carfare working sheet is input from the input unit 1, a slip input processor 6 receives and processes this data. The processed data is written in a slip record memory 7. A slip item name memory 8 prestores the slip name in correspondence with the slip record and slip item names in the chronological order. The slip input processor 6 reads out the contents of the slip record memory 7 together with the slip item name corresponding to the slip record. The readout data are supplied to a record processor 10 constituting a read file processor 9.

In addition to the record processor 10, the file processor 9 includes an original book registration slip analyzer 11, a file generation processor 12, a journalizing processor 13, a work file 14, and a parts expansion processor 15. The original book registration slip analyzer 11 receives the original book registration slip corresponding to the data file designated as an updating target and analyzes the set contents thereof in updating the records of the data file. The analysis result is supplied to the record processor 10. In this case, when the data file set in the original book registration slip is not present in the system, the original book registration slip analyzer 11 activates the file generation processor 12. The file generation processor 12 generates a new data file having a record arrangement in an arrangement order of item names on the basis of the file name of the data file and the record item names set in the original book registration slip and sets the newly generated data file in correspondence with the original book registration slip.

The record processor 10 generates records on the basis of the analysis result of the original book registration slip analyzer 11 in updating the records of a transfer schedule file, a sales schedule file, or an accounting schedule file, and stores the generated records in the work file 14. When a processing target in updating the records of the data file is a slip, the record processor 10 generates records in a rearrangement order of the records in the slip record memory 7 in accordance with the order of the slip item names set in the original book registration slip. In rearranging these record items, the record processor 10 refers to the contents of the slip item name memory 8, checks the item positions of the slip item names set in the original book registration slip, and extracts and rearranges the item data. When the processing target is a file such as the transfer schedule file or the sales schedule file, the record processor 10 extracts the data of the record items of the processing target file set in the original book registration slip and generates records whose item data are rearranged and which constitute the processing target file such as the transfer schedule file or the sales schedule file. The generated records are then stored in the work file 14.

When the description contents of "definition" in the original book registration slip, for example, represent that item data should be generated with reference to an index table as in "#index (customer tb, customer cd, customer name)" of the Eth column and 23rd row, the record processor 10 refers to the corresponding one of the various index tables preset in the system to generate item data. The item data are set at the corresponding item positions in the work file 14. When "#slip serial number" and "#appointed date" are described in the columns of "definition" of the original book registration slip, the slip serial number and the date information are set at the corresponding item positions in the work file 14.

When "journalizing" is set in the column of "function name" of the original book registration slip, the journalizing processor 13 refers to the journalizing table in the generation table 5-2 to generate data of necessary items (i.e., items affixed with "$" and "@" in the original book registration slip) and performs journalizing for setting the generated data at the corresponding item positions in the work file 14. In this case, the journalizing processor 13 performs "multiple journalizing", "composite journalizing", or "transfer journalizing" in accordance with the description contents of the journalizing table.

When "parts expansion" is set in the column of "function name" in the original book registration slip, the parts expansion processor 15 refers to the expansion table in the original book registration slip 5-2 to generate necessary items (i.e., items affixed with "$" and "@" in the original book registration slip). The generated data are set at the corresponding positions in the work file 14, and the parts expansion process is performed.

More specifically, when "$" and "@" are added to items which are not present in the data file set as the input original book in the original book registration slip, the journalizing process and the parts expansion process serve as the item data generation processes for generating data of necessary items in accordance with the journalizing and expansion tables corresponding to this original book registration slip.

The file processor 9 receives the contents of the work file 14 and updates the records of one of the data files (e.g., the X, Y, and Z files 3, 4, and 5) which is set as "original book name" in the original book registration slip. In this case, the file processor 9 checks "updating classes" set in the original book registration slip, updates the records of the data file in accordance with "updating classes", and totalizes and adds records.

The book/slip output processor 16 outputs a book/slip record on the basis of the original book registration slip corresponding to the designated data file and one of the various data files registered as the transfer schedule file, the sales schedule file, and the accounting schedule file in the X, Y, and Z files 3, 4, and 5, which is arbitrarily designated as an output target. A book/slip in a predetermined form is output from a printing unit 17 or a display unit 18. At this time, a name corresponding to a code may be output or referred to with reference to various tables on the basis of "attribute", "digit count", "table name", and "definition" in the original book registration slip. Alternatively, the book/slip output processor 16 totalizes the records, as needed.

Operations of this embodiment will be described with reference to flow charts in FIGS. 11 through 17.

Figure 11:
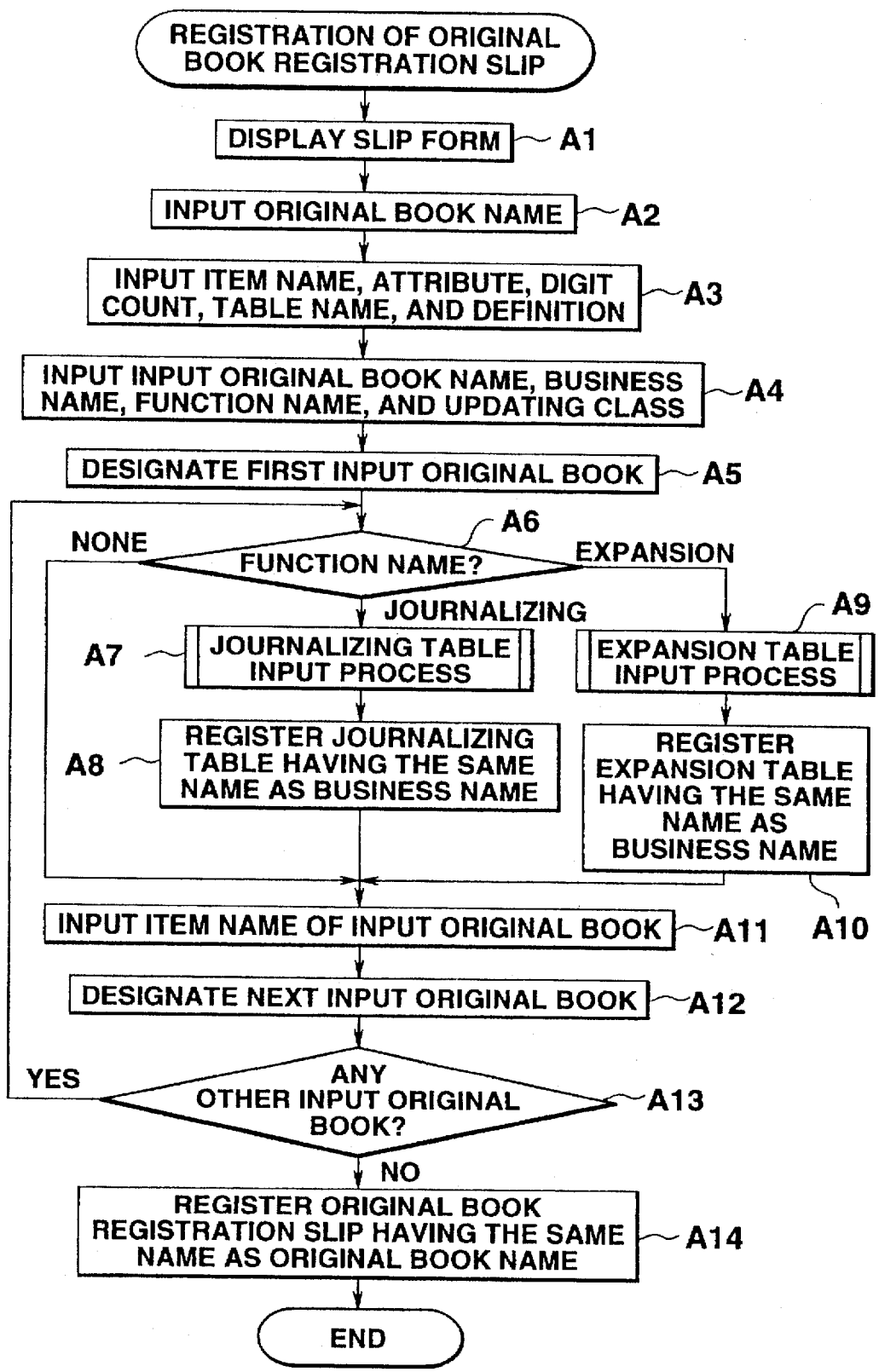
FIG. 11 is a flow chart showing the operation for inputting and creating an original book registration slip to register data.

FIG. 11 is a flow chart showing the operation for inputting and creating an original book registration slip and registering it in the data processing apparatus. At the same time, a journalizing table and an expansion table, which serve as generation tables, are input, as needed.

An original book registration slip is designated to be created at the input unit 1, the input processor 2 displays and outputs a preset slip form of the original book registration slip (step A1). In this case, an end user can understand specific items as management items in daily operations and describes necessary items in the predetermined columns of the original book registration slip so as to match his own business contents.

More specifically, the person in charge or the like inputs the file name of a data file in correspondence with the caption "original book name" in accordance with the above slip form (step A2). At the same time, he inputs "attribute", "digit count", "table name", and "definition" in correspondence with the respective item names of the data file set in "original book name" (step A3). As shown in FIGS. 2 through 4, necessary items are input below the horizontal double line, as shown in FIG. 4, in correspondence with the items required in outputting a book/slip.

A slip or file name serving as a processing target in correspondence with "input original book name" is input in units of slips or files. Necessary items are sequentially input in the filling columns in correspondence with the captions "business name", "function name", and "updating class" (step A4).

When a plurality of "input original book names" are present, all the names are input.

The input processor 2 designates the first input original book name (step A5) and checks if "journalizing" and "expansion" as the corresponding function names are set (step A6). If settings for designating execution of these special processes are not made, the flow advances to step A11 to sequentially input the slip names or item names of the file records in correspondence with the input original book.

All the inputs are completed for one input original book, the input processor 2 designates the next input original book name of the original book registration slip (step A12) to check if the next input original book is present (step A13). If another input original book is present, the flow returns to step A6. As "journalizing" is set in the original book registration slip shown in FIG. 4, the flow advances to step A7 to perform a journalizing input process (to be described later in accordance with the flow chart in FIG. 12). Subsequently, the input processor 2 adds the same name as "business name" set in the original book registration slip to a journalizing table as its title name and registers the journalizing table (step A8). In this manner, after the journalizing table is created and registered, item names are sequentially input in correspondence with the designated input original book (step A11).

Figure 13:
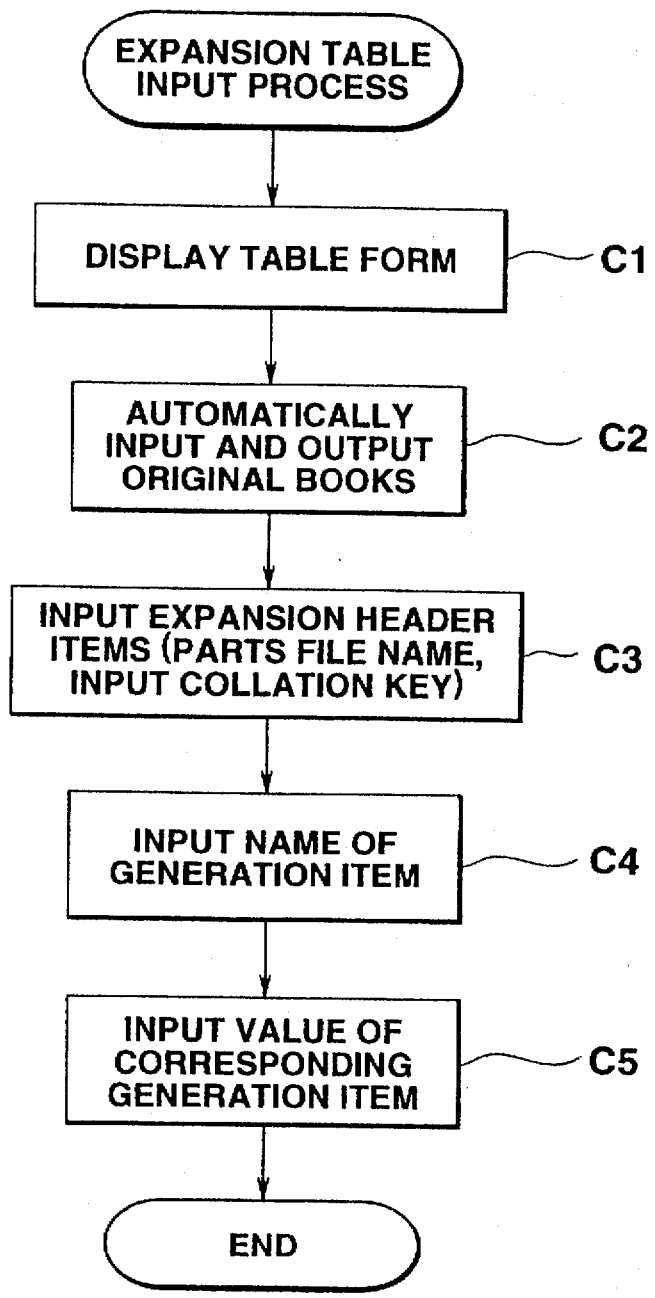
FIG. 13 is a flow chart showing step A9 (expansion table input process) in FIG. 11.

On the other hand, if "parts expansion" is set as the function name in the original book registration slip shown in FIG. 6, this is detected in step A6, and the flow advances to step A9 to perform an expansion table input process (to be described later with reference to the flow chart in FIG. 13). Subsequently, the same name as "business name" set in the original book registration slip is added to an expansion table as its title name to register the expansion table (step A10). In this manner, after the expansion table is created and registered, item names are sequentially input in correspondence with the designated input original book (step A11).

When the above operations are repeated to complete the process for all the input original books, the flow advances to step A14 to add the same name as the original book name to the original book registration slip as its title name, thereby registering the original book registration slip.

Figure 12:
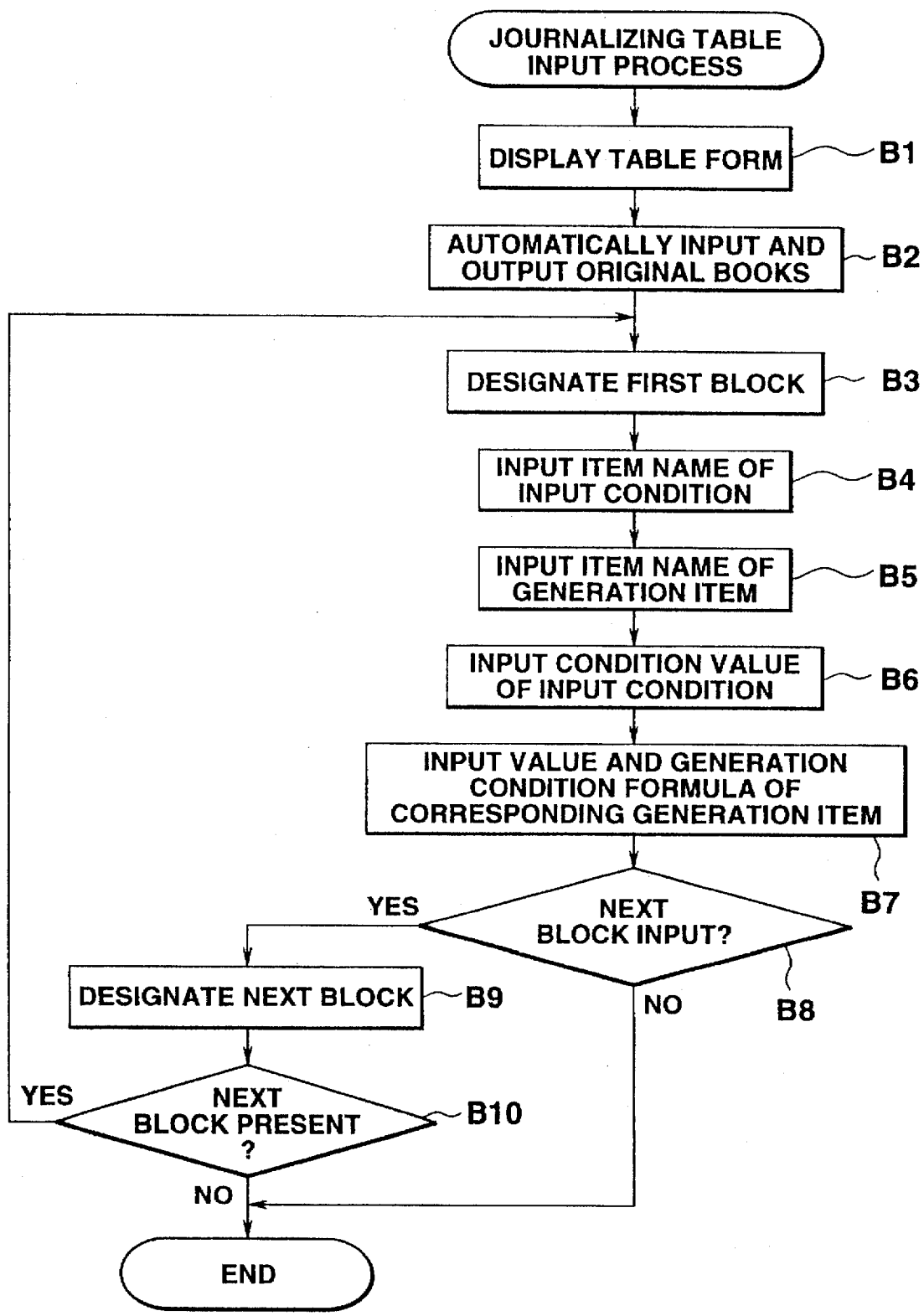
FIG. 12 is a flow chart showing step A7 (journalizing table input process) in FIG. 11.

The journalizing table input process described above will be described in detail with reference to the flow chart in FIG. 12. The journalizing table shown in FIG. 5 will be input and created on the basis of the original book registration slip shown in FIG. 4.

The table form of the journalizing table is displayed and output (step B1). At the same time, the original book name and the input original book name are read from the original book registration slip shown in FIG. 4. A file name of "sales schedule file" is automatically input as an input original book in the journalizing book shown in FIG. 5, and a file name of "accounting schedule file" is automatically input as an output original book (step B2). The first one of the blocks constituting the journalizing table is designated as an input target (step B3).

After the above initialization is performed, item names are sequentially input from the input unit 1 in correspondence with "input conditions" of the first block (step B4). In this case, the item names of the sales schedule file set as the original book name in the original book registration slip shown in FIG. 3 are listed and displayed on the window screen. When an arbitrary item name "transaction class", "transaction division", or "customer cd" is selected as an input condition, the selected item name is set as the input condition item of the first block. Generation items of the first block are then input (step B5). In this case, the item names of the sales schedule file set as the input original book name in the original book registration slip shown in FIG. 4 are listed and displayed on the window screen. An arbitrary item name "$debit account cd", "$credit account cd", or "@amount" is selected as a generation item. The item name selected by this generation item is set as the generation item of the first block. In addition, condition values are input in correspondence with the items of input conditions (step B6), and a generation item value and a generation condition calculation formula are input on the same row in correspondence with the condition value (step B7). In this case, "multiple journalizing" can be defined depending on the way of describing the input conditions. More specifically, a description of serial numbers "09" and "10" in the journalizing table of FIG. 5 represents such "multiple journalizing". Generation items of a plurality of records are caused to correspond to each other under the same condition.

When all the inputs for the first block are completely entered, the flow advances to step B8 to check if inputs to the next block are designated from the input unit 1. If so, the next block constituting the journalizing table is designated (step B9). Under the condition that the designated block is present (step B10), an input process for the designated block is performed (steps B4 through B7). In this case, the intermediate block is designated, and the item names of input conditions are input in the same manner as described above (step B4). In the intermediate block of the journalizing table shown in FIG. 5, the generation items of the intermediate block are items generated on the basis of the input conditions of the intermediate block and at the same time items set as condition items representing the input conditions of the next, e.g., last block. This operation indicates "transfer journalizing" previously described. The names of these items are directly input from the input unit 1 (step B5). The input condition items and the contents of the generation items are input in correspondence with the respective rows of the intermediate block (steps B6 and B7).

The last block of the journalizing table is designated (step B9). An input process for the last block is performed (steps B4 through B7). In this case, as for the item names of the input conditions, item names arbitrarily designated from the generation items of the intermediate block are set as the item names of the input conditions (step B4). In the journalizing table shown in FIG. 5, "$debit account cd" is set as an input condition item. Note that a desired item name is selected from a displayed list to input a generation item as in the last block described above. The input condition items and the contents of the generation items are input in correspondence with the respective rows of the last block (steps B6 and B7). In this case, the input conditions with serial numbers "15" and "16" of the journalizing table represent "multiple journalizing".

The expansion table input process described above will be described in detail with reference to the flow chart in FIG. 13. Assume that the expansion table in FIG. 6 is input and created on the basis of the original book registration slip shown in FIG. 7.

The table form of the expansion table is displayed and output (step C1). At the same time, an original book name and an input original book name are read out from the original book registration slip shown in FIG. 7. The file name of "finished goods file" is automatically input as the input original book in the expansion table shown in FIG. 6. The file name of "finished goods constitution file" is automatically input as an output original book (step C2). Subsequently, "parts name", and "input collation key" are input from the input unit 1 as other header information of the expansion table (step C3). As shown in FIG. 6, the name of "parts file" is input and set as the parts name. An arbitrary item name "parent name" constituting the record of the finished goods file shown in FIG. 8 is input and set as the input collation key.

An item name is input in correspondence with each generation item (step C4). The contents of each generation item is input in correspondence with this generation item (step C5). In this case, the item names of the finished goods file set as the input original book in the original book registration slip shown in FIG. 7 are listed and displayed on the window screen. Of all the displayed item names, an arbitrary item name "$parent code", "$child code", "@predetermined count", "@unit price", or "@amount" is selected as a generation item. The selected item name is set in the expansion table as the generation item name. Of all the items constituting the parts file shown in FIG. 9, an arbitrary item name is input from the input unit 1, and at the same time, the contents of each generation item are input. In this case, the item contents corresponding to the generation item names "@predetermined count" and "@amount" are multiplication calculation formulas using, as variables, the item data represented by the respective item names. The contents of the necessary items can be set even with a description of these calculation formulas.

The original book registration slip and the generation tables (journalizing and expansion tables) which are input and generated as described above are registered in correspondence with data files such as the X, Y, and Z files 3, 4, and 5 as shown in FIG. 1. In this state, the file processor 9 executes file processing in accordance with the description contents of the original book registration slip and the generation table 5-2.

Figure 14:
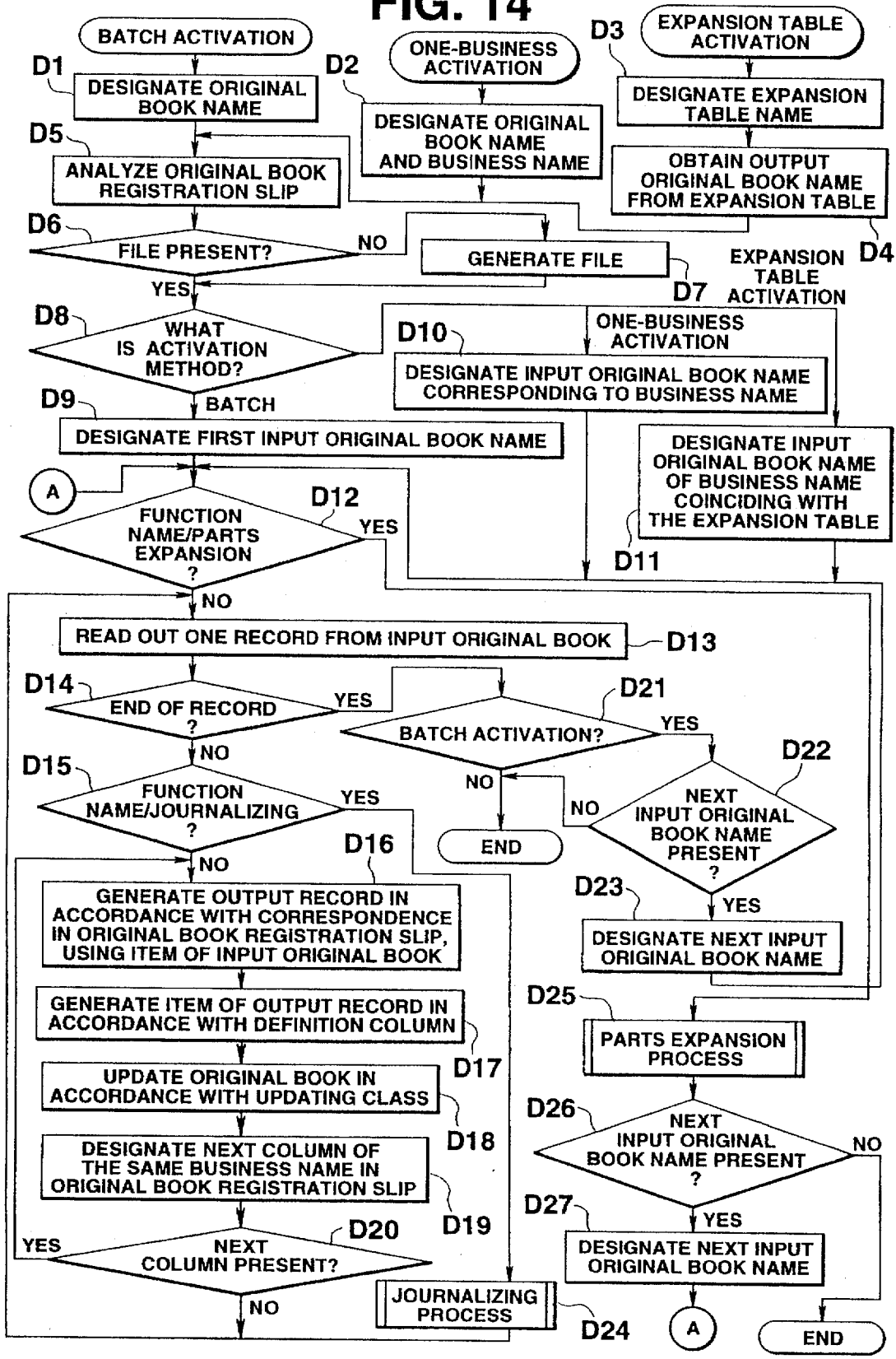
FIG. 14 is a flow chart showing the operation for executing a file updating process on the basis of the original book registration slip.

FIG. 14 is a flow chart showing execution of this file processing. In this embodiment, three file processing activation methods, i.e., "batch activation", "one-business activation", and "expansion table activation" are available. Any one of the activation methods can be arbitrarily designated.

More particularly, "batch activation" is a method of activating, as processing targets, all the plurality of input original book names set in the original book registration slip. For example, in the original book registration slip shown in FIG. 4, "transfer schedule file" and "sales schedule file" serve as processing targets. "One-business activation" is a method of activating only the input original book corresponding to an arbitrarily designated business name as a processing target when a plurality of input original book names are set in the original book registration slip. For example, in the original book registration slip shown in FIG. 4, when "transfer schedule posting" is designated as a business name, only the transfer schedule file serving as the input original book corresponding to this business name serves as a processing target. "Expansion table activation" is a method of activating, as a processing target, the file of the input original book name set in the original book registration slip in correspondence with a business name when the name (e.g., table ) of the expansion table is set as this business name of the input original book in the original book registration slip (see FIG. 7) in a state wherein the expansion table shown in FIG. 6 is registered. In the original book registration slip shown in FIG. 7, the finished goods file serves as a processing target.

In the batch activation mode, when "original book name" set in the original book registration slip is input from the input unit 1, the corresponding original book registration slip is designated (step D1). In the one-business activation mode, when "business name" is input from the input unit 1 in addition to "original book name", an original book registration slip corresponding to this original book name is designated (step D2). In the expansion table activation mode, when the name of an expansion table is input from the input unit 1, the corresponding expansion table is designated (step D3). In this case, the output original book name is read from the designated expansion table, and an original book registration slip having the readout name as the original book name is designated (step D4).

When the original book registration slip is designated as described above, the original book registration slip analyzer 11 in the file processor 9 analyzes the designated original book registration slip (step D5). The original book registration slip analyzer 11 checks on the basis of the original book registration slip if a data file set as "original book name" is actually present in the system (step D6). If NO in step D6, the original book registration slip analyzer 11 activates the file generation processor 12.

The file generation processor 12 reads out the file name and its item names, attribute, and digit count which correspond to "original book registration slip" in accordance with the analysis result of the original book registration slip analyzer 11, generates a data file having a record arrangement consisting of items having predetermined digit counts in an arrangement order, and registers this data file in correspondence with the original book registration slip (step D7). In this manner, a data file corresponding to the original book registration slip can be newly created on the basis of this original book registration slip according to this embodiment. Note that a data file is already present, this file generation process is not executed.

The file processor 9 then checks an activation method designated in advance in file execution (step D8). If the batch activation mode is designated, the first "input original book name" set in the original book registration slip is designated (step D9). When the one-business activation mode is designated, "input original book name" in the original book registration slip which corresponds to the corresponding business name is designated (step D10). When the expansion table activation mode is designated, "input original book name" of the original book registration slip which coincides with the name of the expansion table and is set as the business name is designated (step D11). When the input original book serving as a processing target is specified in accordance with the given activation method, the flow advances to step D12. In this step, the original book registration slip analyzer 11 checks if "parts expansion" is set as the function name of the original book registration slip. If No in step D12, the file processor 9 activates the record processor 10.

The record processor 10 designates a corresponding data file from the X, Y, and Z files 3, 4, and 5 on the basis of the input original book name designated as the processing target in accordance with the activation method. The record processor 10 then extracts one-record data from the designated file (step D13). If the input original book name designated as the processing target is a slip, the record processor 10 reads out the contents of the slip record memory 7 and the slip item name memory 8 and receives the contents of the slip record memory 7 as an extracted record. Under the condition that the record is not ended (step D14), the flow advances to step D15 to cause the original book registration slip analyzer 11 to analyze the original book registration slip and check if "journalizing" is set in its function name. Assuming that journalizing is not set, the record processor 10 generates, as an output record, a record obtained by rearranging the item data of the extracted record in the arrangement order of item names set in correspondence with the input original book name in the original book registration slip. The record processor 10 then sets the output record in the work file 14 (step D16). In this case, if the input original book is a slip, the record processor 10 sequentially reads the slip item names set in the original book registration slip from the beginning and rearranges the item data while checking specific item positions of the corresponding item data in the extracted record because the contents of the slip item name memory 8 are different from the slip item names set in the original book registration slip in the number of items, the arrangement order, and the item names.

When the record processor 10 generates the record obtained by rearranging one-record data of the input original book in accordance with the description contents of the original book registration slip, the original book registration slip analyzer 11 refers to the contents of the definition columns (each row of the Eth column in the original book registration slip shown in FIG. 4) of the original book registration slip, generates the data of the necessary items in accordance with the description contents of the definition columns, and sets the generated data at the corresponding item positions in the output record set in the work file 14 (step D17). In this case, the definition columns have generation conditions for defining that item data which are present in the record of the data file set as the original book name in the original book registration slip but are not present in the input original book are to be generated. The record processor 10 generates item data with reference to an index table, as needed.

The original book registration slip analyzer 11 then refers to "updating class" set in the original book registration slip. The record processor 10 updates the record of the data file in accordance with "updating classes". In this case, if "addition" is set as the updating class, the record processor 10 adds the output record in the work file 14 to the data file set as "original book name" in the original book registration slip (step D18). If "totalizing" is set as the updating class, the output record in the work file 14 is totalized in the data file.

When the one-record updating process is completed, the flow advances to step D19. The original book registration slip analyzer 11 analyzes the original book registration slip, designates the next column of the same business name, and checks if an item name is described in this designated column (step D20). In the original book registration slip shown in FIG. 4, assume that input original book "transfer schedule file" is designated as a processing target. If the next column is designated at the end of process executed according to the description contents of "debit" of the first column, an item name described in the second column "credit" is detected in step D20, and the flow returns to step D16. The same process as described above is executed for this designated column (steps D16 through D18). When the absence of the next column is detected, the flow returns to step D13. The next one-record data is extracted from the input original book. The operations in steps D16 through D20 are repeated every record for all the records of the input original book.

When all the records are completely processed, the file processor 9 checks the activation method again (step D21). If the batch activation mode is set, the original book registration slip analyzer 11 analyzes the original book registration slip to check if the next input original book name is set (step D22). If YES in step D22, the original book registration slip analyzer 11 designates the next input original book name (step D23), and this input original book serves as a processing target in the subsequent processing. The flow then returns to step D12. When the batch activation mode is designated, all the input original books set in the original book registration slip serve as processing targets. The above operations are repeated until the end of processing for all the input original books is detected in step D22.

Figure 15:
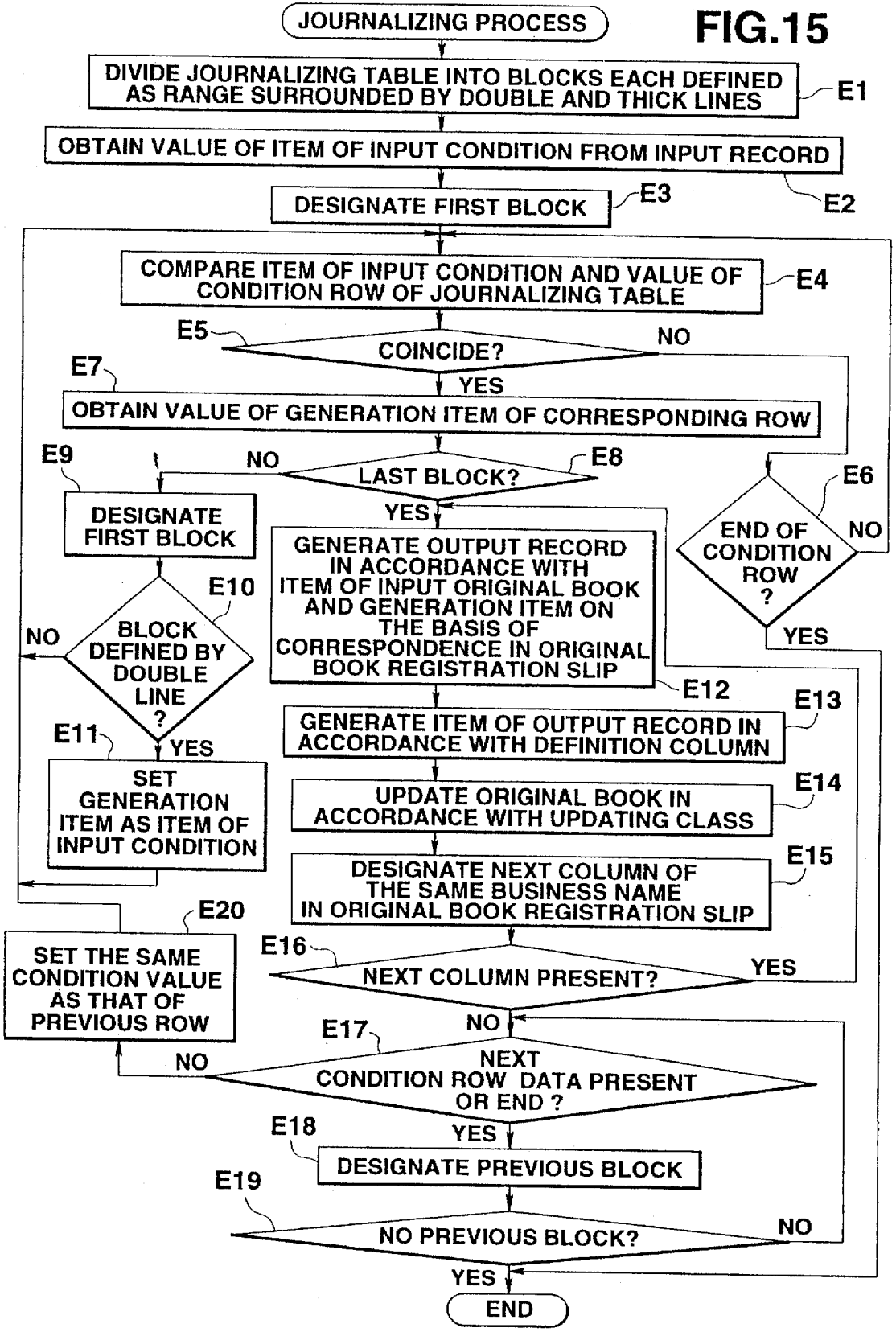
FIG. 15 is a flow chart showing step D24 (journalizing process) in FIG. 14.

On the other hand, when the original book registration slip analyzer 11 detects that "journalizing" is set as a result of analysis of "function name" of the original book registration slip (step D15), the journalizing processor 13 is activated to execute a journalizing process (step D24) (to be described later) in accordance with the flow chart shown in FIG. 15. This journalizing process processes one-record data of the input original book. When the one-record journalizing process is completed, the flow returns to step D13. The next record is read out from the input original book, and the journalizing process is then repeated every record.

When the original book registration slip analyzer 11 detects that "parts expansion" is set in the function name of the original book registration slip (step D12), the parts expansion processor 15 is activated to execute a parts expansion process (step D25) to be described later with reference to FIGS. 16 and 17. This parts expansion process processes this input original book as a unit. When all the records constituting the input original book are completely processed, the original book registration slip analyzer 11 checks if the next input original book name is set in the original book registration slip (step D26). If the next input original book name is set, this is designated as the next processing target (step D27). The flow then returns to step D12. If the function name of the next input original book is also "parts expansion", the parts expansion process (step D25) is executed. However, when the function name of the next input original book is "journalizing", the journalizing process (step D24) is executed.

The journalizing process will be described below with reference to the flow chart in FIG. 15. This journalizing process will be described in detail with reference to FIGS. 18 through 20.

Assume that the journalizing process shown in FIG. 5 is registered in correspondence with the original book registration slip shown in FIG. 4. FIG. 18 shows part of the sales schedule file serving as the input original book. Only record item values required for the journalizing process are shown in FIG. 18. FIG. 19 shows the contents of the generation items generated on the basis of the record item values and the journalizing table of the input original book shown in FIG. 18. FIG. 20 shows the record contents corresponding to the generation items when the accounting schedule file set as the output original book in the journalizing table is updated on the basis of the record item values generated on the basis of the journalizing table. In this case, the left side of FIG. 20 shows the record number of the input original book, the serial number representing the condition row whose condition coincides with the input condition for each block constituting the journalizing table, and the output timing of the record generated and output for each record upon updating the file. FIG. 20 shows specific condition for a record which updates the accounting schedule file.

The original book registration slip analyzer 11 detects double and thick lines serving as the horizontal rules lines constituting the journalizing table and divides the entire area into blocks each surrounded by the double and thick lines (step E1). The record processor 10 then reads out item names "transaction class". . . , "partner warehouse cd" corresponding to all input conditions set in the journalizing table and extracts the item data of the input record which correspond to these input condition items (step E2). In this case, item data having record number "1" shown in FIG. 18 are extracted as items corresponding to all the input conditions. The first block of the journalizing table is designated (step E3).

The record item values extracted from the input record are compared with the condition item values in the designated block (step E4). The record item values are transaction class "20", transaction division "3", customer cd "70002145" and do not equal to those of the first condition row (step E5). For this reason, the condition row is updated. Until a coincidence is established (step E5), or the end of condition row within the range of the designated block is detected (step E6), the record item values are sequentially compared with the condition item values (step E4).

Since the condition item value of the first block serial number "03" coincides with the record item value, the generation item values, i.e., $debit count cd "5221" and $credit account cd "1161" set on the same row of the journalizing table are read out. At the same time, @amount −12000" is obtained (step E7). Since the designated block is not the last block (step E8), the next block is designated (step E9). In this case, since the intermediate block is designated, this block is detected as a block not divided by the double lines (step E10). The flow returns to step E4, and subsequently the condition item values of the intermediate block are compared with the record item values. In this case, the condition item value corresponding to serial number "11" of the intermediate block coincides with transaction enterprise cd "600" of the record item value (step E4), generation item values, i.e., $debit account cd "30" and $credit account cd "30" set in the same row of the journalizing table are read out to obtain the corresponding generation item values.

In this case, since NO is determined in step E8, the next block is designated (step E9). Since this designated block is a block divided by the double line (step E10), the current generation item is set as the input condition for the block divided by the double line (step E11). The flow then returns to step E4. The values of $debit accounting cd and $credit accounting cd which are defined as the generation items of the intermediate block are "30" each. When this generation item value is used as an input condition and compared with the input condition of the journalizing table, the generation item value coincides with the input condition of serial number "17" of the last block. For this reason, $debit accounting cd "30" is generated as $debit accounting unit serving as the generation item of this block, and $debit account cd "5221" and $credit account cd "1161" are generated as $debit account and $credit account, respectively (step E7).

The generation items generated in correspondence with record number "1" shown in FIG. 18 are given as shown in FIG. 19. At this moment, all the generation items are prepared for the corresponding records.

Since the last block is detected in step E8, the flow advances to step E12 to generate an output record. All the item names of the input original book (sales schedule file) set in the original book registration slip shown in FIG. 4, item data corresponding to item names not affixed with "$" and "@" are extracted from the input record. An output record is generated on the basis of the extracted item data and item data generated in correspondence with item names affixed with "$" and "@" in the original book registration slip. In this case, the output record, whose item data are rearranged in accordance with the arrangement order of the item names of the sales schedule file set in the original book registration slip, is generated and set in the work file 14. Since the item names are described in correspondence with "debit" and "credit" in the original book registration slip shown in FIG. 4, the first output record is a "debit" record.

Data of the necessary items are generated in accordance with the description contents of "definition" of the original book registration slip and set at the corresponding item positions in the work file 14 (step E13). In this case, since the original book registration slip shown in FIG. 4 defines in the 23rd and 30th rows of the Eth column that item data should be generated with reference to the index table, item data (customer name) read out from the index table is set in the work file 14.

As described above, one-record "debit" output record is generated. In this case, the generation items of the output record generated on the basis of the journalizing table are $credit account cd "5221", $credit accounting unit "30", $debit accounting unit "30", and $debit account "30". In this case, "$credit account cd" is an item generated under the input condition for one block, while "$credit accounting unit", "$debit accounting unit", and "$debit account" are items generated by "composite journalizing" under the input conditions of the plurality of blocks and at the same time items generated by "transfer journalizing" under the input condition of the last block which is derived from the generation items of the intermediate block.

The record processor 10 reads out the output records from the work file 14 and updates the accounting schedule file in accordance with "updating class" set in the original book registration slip (step E14). In this case, when the accounting schedule file is updated on the basis of the generation item values generated on the basis of the journalizing table and selected from the record items of "output 01" shown in FIG. 20, the contents of the first record corresponding to these generation items are shown in FIG. 20.

The next column of the same business name in the original book registration slip is designated (step E15) to check if the next column is present (step E16). Since each item name for "credit" is set in the next column, the flow returns to step E12, and then a "credit" output record is generated (steps E12 and E13). In this case, the generation items in the output record generated on the basis of the journalizing table are $debit account cd "5221", $debit accounting unit "30", $credit accounting unit "30", and $credit account "1161".

When the accounting schedule file is updated on the basis of this output record "output 02" (step E14), the contents of the second record of the accounting schedule file are shown in FIG. 20.

The flow then advances to step E15. In this case, since the next column is not present, the flow advances to step E17 to check if data is described in the next condition row or the condition row is ended. Since the last row of the last block is kept designated, "YES" is determined in step E17, and the immediately preceding block is designated (step E18) to check if a block is present (step E19). In this case, since the intermediate block is designated, the flow returns to step E17 to detect the next condition row of the intermediate block, i.e., the condition row of serial number "12". In this case, an input condition is described in this condition row, so that the immediately preceding block is further designated (step E18). By this operation, the first block is designated, and the next condition row of the first block, i.e., the condition row of serial number "04" is detected. An input condition is also described in this row, and the flow advances to step E18. At this time, the absence of the previous block is detected, and the journalizing process in FIG. 15 is ended.

The previous blocks are sequentially designated while repeating the operations in steps E17 through E19 to detect the next condition row of each designated block because whether the "multiple journalizing" process is required is checked.

The second record is read out from the input original book and the journalizing process (FIG. 15) of the second record is started. The generation items generated in correspondence with record number "2" shown in FIG. 19 are shown in FIG. 19, and the contents of the accounting schedule file updated by these generation items are shown in FIG. 20.

More specifically, when the first block is designated (step E3), the item values of the input record coincide with the contents of the condition row of serial number "09", so that the item data are generated in accordance with the generation items of the same row (step E7). The intermediate block is then designated (step E9). The record item values of the intermediate block coincide with the contents of the condition row of serial number "12", so that the generation items of the same row are generated (step E7). The last block is then designated (step E9). In this case, the generation items of the intermediate block serve as input conditions (step E11). If $debit accounting cd≠$credit accounting cd, then the item values of the input record coincide with the condition line of serial number "15" of the last block, so that the generation items of the same row are generated (step E7).

"Debit" output record "output 03" is generated using these generation items, thereby updating the accounting schedule file. Subsequently, "credit" output record "output 04" is generated to update the accounting schedule file (steps E12 through E16).

The flow then advances to step E17. No data is described in the next condition row (serial number "16"), and the flow advances to step E20. The same condition values as those of the previous row are set as the condition values of this row, and the flow returns to step E4. In this case, since a coincidence is detected in step E5, item data are generated in correspondence with the generation items set on the same row as that of the condition row of serial number "16". By using these generation items, "debit" and "credit" output records "output 05" and "output 06" are sequentially generated to update the accounting schedule file. Since the presence of data is detected on the next condition row in step E17, the immediately preceding block, i.e., the intermediate block is designated (step E18). Since data is present in the next condition row (serial number "13") of the intermediate block, the immediately preceding block, i.e., the first block is designated. In this case, no data is described in the next condition row (serial number "10") of the first block, so that the flow advances to step E20 again. The condition values of the previous row are set as the condition values of this row, and the flow returns to step E4. In this case, a coincidence is detected in step E5, so that the item data are generated in correspondence with the generation items set in the same row as the condition row of serial number "10". By using these generation items, "debit" and "credit" output records "output 07" and "output 08"are sequentially generated to update the accounting schedule file.

Since the end of the condition row is detected in step E17, the immediately preceding block is designated. In this case, any other preceding block is not present (step E19). At this time, the journalizing process in FIG. 15 is ended. A total of eight records as "debit" and "credit" records are generated in correspondence with input original book "record number 2", and the accounting schedule file is updated on the basis of these records. More specifically, the rows of serial numbers "10" and "16" of the journalizing table indicate "multiple journalizing" for generating generation items under the same input condition set in the preceding row, so that 2-record generation items are generated for the rows of serial numbers "10" and "16". Updating is performed using a data file upon generating a total of eight records, i.e., four "debit" records and four "credit" records.

The parts expansion process will be described with reference to the flow charts in FIGS. 16 and 17. Assume that the expansion table shown in FIG. 6 is registered in correspondence with the original book registration slip shown in FIG. 7.

Figure 21:
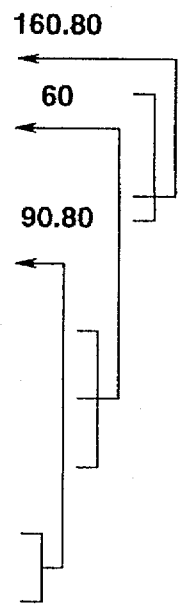
FIG. 21 is a view showing an intermediate file in which data of generation items are stored in the parts expansion process.

The items corresponding to generation item names "$parent code", . . . , "@unit price" set in the expansion table are assigned to the intermediate file in the work file 14 to generate an intermediate file (step F1). FIG. 21 shows the intermediate file. This file is a file required in the parts expansion process and serves as a work file created to store and hold item data generated in accordance with the description contents for each generation item set in the expansion table shown in FIG. 6. Note that "$level" items are added in the intermediate file as items except for the generation items defined in the expansion table shown in FIG. 6.

A finished goods file set as the input original book in the original book registration slip accesses to read out one-record data (step F2) and to check an end of file (step F3). At this time, since the start record is read out, the flow advances to step F4. As shown in FIG. 8, the start record has parent name "A" and predetermined count "1". This parent name "A" is set in intermediate file item "$child code", and at the same time predetermined count "1" is set in intermediate file item "@predetermined count". In addition, level "0" is set in the item of "$level" (see the first record in FIG. 21). In this case, item "$level" is the hierarchical level representing the parent-child relationship shown in FIG. 10. Level "0" indicates the uppermost level (root level).

As described above, the record items of the finished goods file serving as the root are set in the start record of the intermediate file, data of the necessary items are generated with reference to the generation item columns of the expansion table, and an intermediate file expansion process is executed (step F5). FIG. 17 is the flow chart showing this expansion process.

The finished goods file set as the input original book is accessed to the expansion table. Of all the record items of the finished goods file, the item contents set as the input collation key in the expansion table is used to retrieve the parts file (step G1). In this case, record item "parent name" of the finished goods file is used as a key to retrieve a record having the same parent name as that of the finished goods file from the parts file in units of records (steps GI through G3).

A record whose parent name is the same as that of the finished goods file is retrieved (step G3), a process for generating data of the necessary items with reference to the generation item filling columns of the expansion table shown in FIG. 6 is executed (step G4). More specifically, the item contents of "parent name" and "child name" of the retrieved record are set in items "$parent code" and "$child code" of the intermediate file. At the same time, item data corresponding to other items "$level", "@predetermined count", "@unit price", and "@amount" of the intermediate file are generated and set at the corresponding item positions. The start record of the parts file is retrieved now. "A" and "a" are respectively set as "$parent code" and "$child code" of the second record of the intermediate file. A value obtained by adding "1" to the parent level set in the intermediate file is set in "$level". The parent for child "a"

of first lower rank is "A". "1" is added to level "0" of "A" to set the level of "a" to "1". A value "1×1=1" obtained by multiplying "predetermined count" of the parent with "use count" of the retrieved record according to the description contents of the generation items shown in FIG. 6 is set in "@predetermined count". Unit price "0" of the retrieved record itself is directly set in "@unit price". In addition, a value "1×0=0" obtained by multiplying "@unit price" with "@predetermined count" is set in "@amount". In this manner, the data of the necessary items are generated with reference to the generation item filling columns set in the expansion table.

The flow returns to step G1. To retrieve a parts file with parent name "A", the second record of the parts file, i.e., the record of child name "b" of parent "A is retrieved, and the operation in step G4 is executed. The third record of the intermediate file is then generated. The third record of the intermediate file has $parent code "A", $child code "b", $level "1", @predetermined count "1", @unit price "10", and @amount "10" (FIG. 21). Subsequently, the third record (record of child name "c" of parent "A") of the finished goods file is retrieved. Therefore, the fourth record of the intermediate file is generated, as shown in FIG. 21.

When all the records, whose parent names coincide with parent name "A", are retrieved from the parts file as described above, the end of file is detected in step G2. The flow then advances to step G5 to check if a coincidence is established in the parts file. Since the parent names of the first to third records in the parts file coincide with that of the finished goods file, the flow advances to step G6 to execute the parts expansion using, as a new parent name, a child name coincident with the parent name (recursive program). That is, step G6 recursively executes steps G1 through G4. Child name "a" coincident with parent name "A" is used as a new parent name, and the operations in steps G1 through G4 are repeated. The fourth to sixth records of the parts file are sequentially retrieved one by one, and the contents of the fifth to seventh records of the parts file are shown in FIG. 21.

In addition to the record of child name "a" coincident with parent name "A", records of "b" and "c" are also present in the intermediate file. The presence of the next child name is detected in step G7, and the operation in step G6 is executed again. In this case, no record having "b" as the parent name is present in the parts file, and step G6 is directly ended. Since the next child name "c" is present, the flow advances to step G6 again. Since a record having "c" as the parent name is present in the parts file, the seventh and eighth records are sequentially retrieved from the parts file. As a result, expansion to the intermediate file is performed on the basis of the retrieved record of child "c", so that the contents of the eighth and ninth records are shown in FIG. 21.

When expansion to the intermediate file using "c" as a new parent name is completed, no record having the next child name as parent "A" serving as the root is present in the intermediate file. The flow then advances to step G8. "Amount" data are extracted from child name records, having the same parent name, of all the records expanded to the intermediate file. The sum of the amounts is calculated, and the total amount is set as the amount of the parent in the intermediate file. More specifically, child names "iv" and "v" have parent "c", so that values "90, 80" as the sums of amounts "40, 40" and "50, 40" in the records are set as the amounts of the records of child name "c". Similarly, the records of child names "i", "ii", and "iii" have parent "a", so that value "60" as the sum of amounts "10", "20", and "30" of the records is set as the amount of the record of child name "a". In addition, the records of child names "a", "b", and "c" have parent "A", so that values "160, 80" as the sums of amounts "60", "10", and "90, 80" of the records are set as the amounts of the first record serving as the root A value obtained by dividing the amount of the parents by the predetermined count of each parent is set as the unit price of each parent. In this case, the first, second, and fourth records of the intermediate file shown in FIG. 21 serve as parents having children. When the amount of the parents is divided by the predetermined count of each parent, the unit price of each parent can be obtained. If a fraction is generated in the unit price calculation, the decimal part is chopped.

Figure 16:
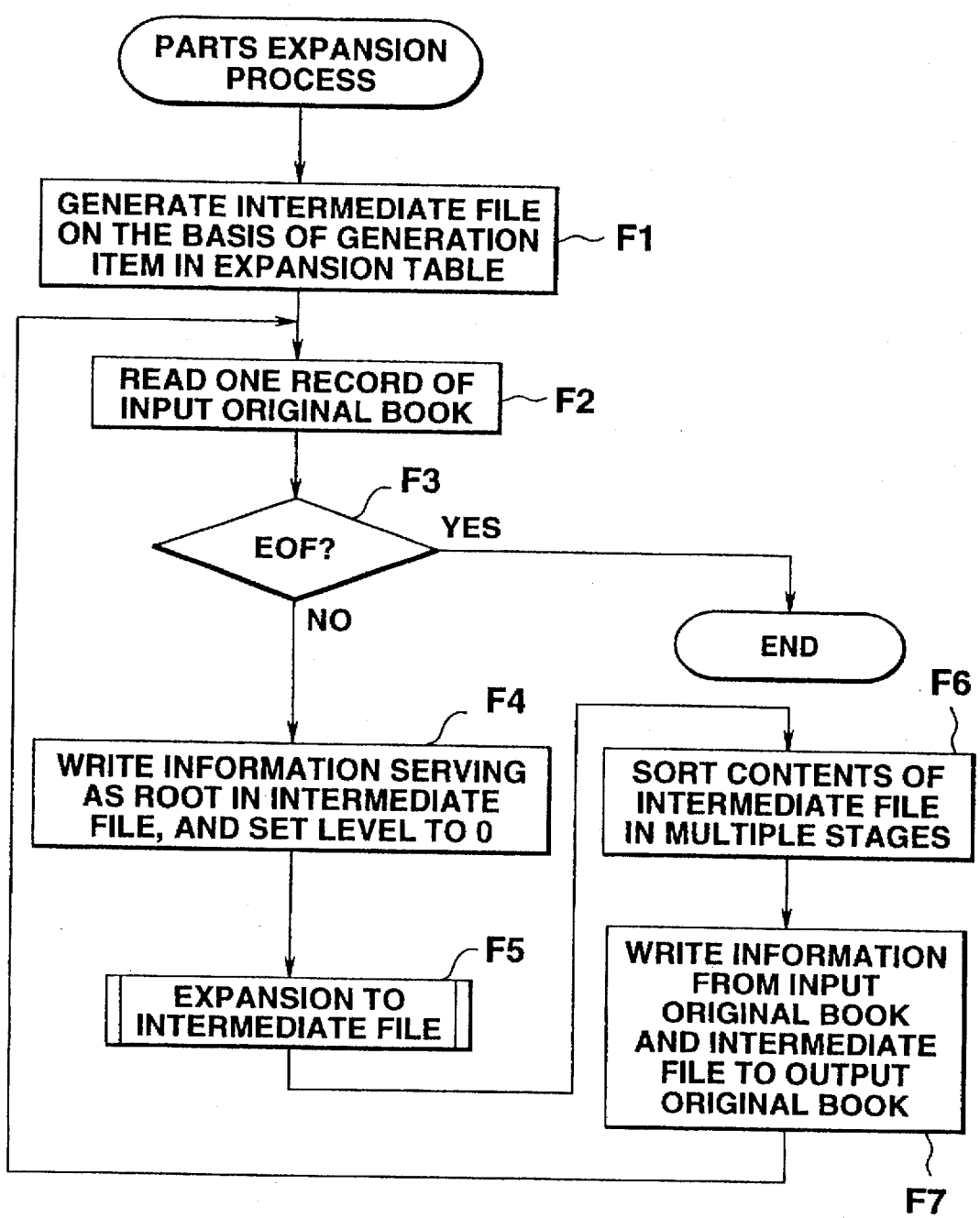
FIG. 16 is a flow chart showing step D25 (parts expansion process) in FIG. 14.
Figure 17:
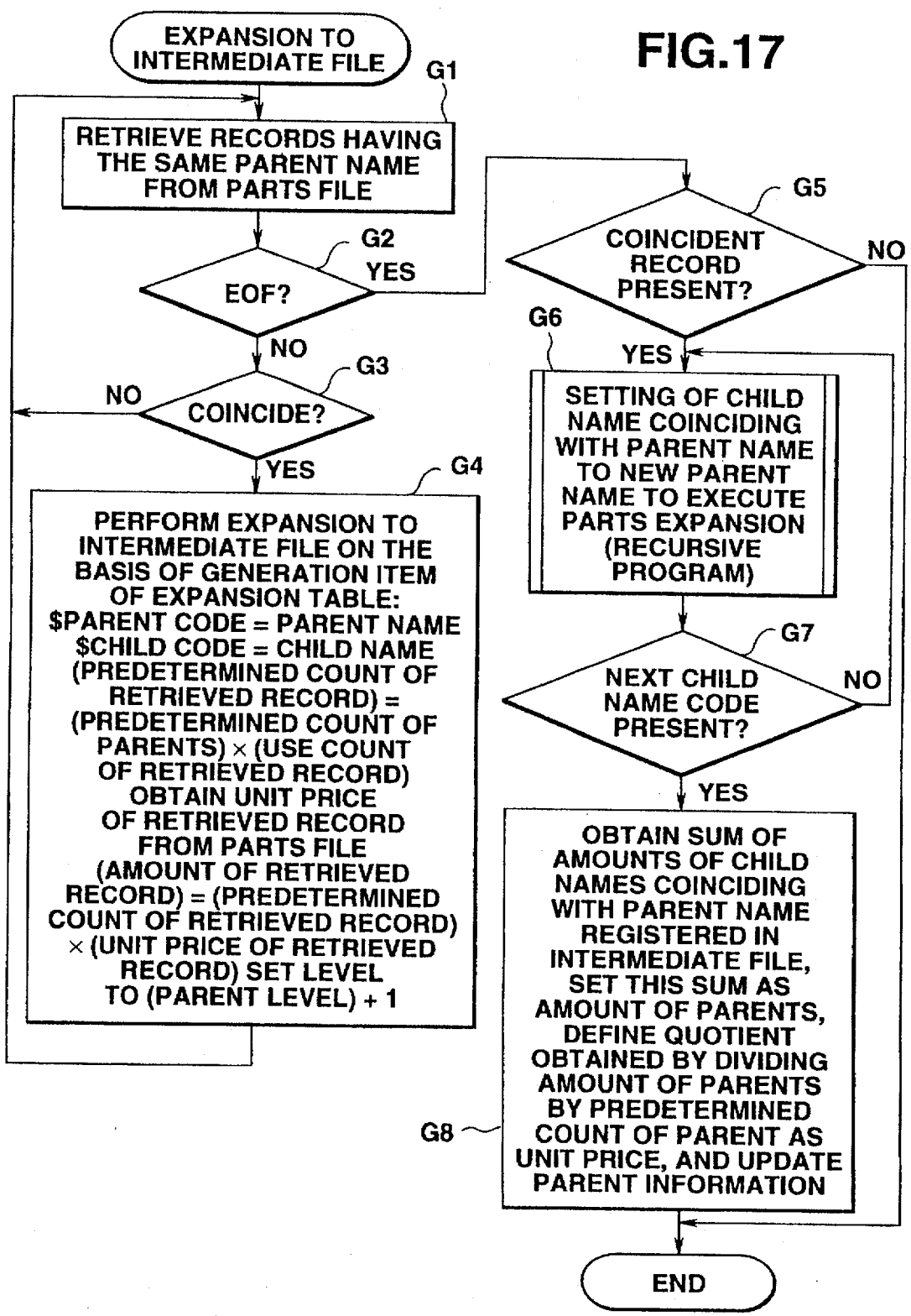
FIG. 17 is a flow chart showing step G5 (expansion process to intermediate file) in FIG. 16.

When the process for performing retrieval in the parts file on the basis of the first record of the finished goods file, generating item data corresponding to the generation items of the expansion table, and expanding the item data to the intermediate file is completed, the flow advances to step F6 in FIG. 16. The contents of the intermediate file are sorted in correspondence with the hierarchical structure of the parent-child relationship (1) in FIG. 10. FIG. 22 shows the contents of the intermediate file whose contents are rearranged in this manner. The first to ninth records of the intermediate file are the contents upon sorting.

Updating to the finished goods constitution file as the output original book is performed on the basis of the contents (first record) of the finished goods file serving as the input original book and the contents (first to ninth records of FIG. 22) of the intermediate file (step F6). That is, the corresponding item data are sequentially read out from the finished goods file and the intermediate file in the arrangement order of item names of the finished goods file set as the input original book in the original book registration slip shown in FIG. 7 to generate an output record. The finished goods constitution file is updated on the basis of this output record. In this case, parent name "A" is read out from the first record of the finished goods file, and the item data of the first record of the intermediate file are sequentially read out to generate an output record. In this case, in the original book registration slip shown in FIG. 7, a definition that the values must be rounded to the nearest is given in the filling columns of item names "@unit price" and "@amount", and arithmetic operations for these values are also performed. When the file is updated on the basis of this output file, the second record is read out from the intermediate file. Subsequently, file updating up to the ninth record of the intermediate file is performed in the same manner as described above.

When the operation based on the first record of the finished goods file is completed, the flow returns to step F2 of FIG. 16. The second record (record of parent name "B") is read out from the finished goods file, and the same operations as described above are repeated. In the intermediate file shown in FIG. 22, the 10th to 18th records are the sorted contents generated based on the second record of the finished goods file and correspond to parent "B" serving as the root. Updating to the finished goods constitution file is performed on the basis of the contents of the intermediate file and the second record of the finished goods file, both of which correspond to parent "B". Thereafter, when the end of file is detected in step F3, the parts expansion process is ended.

As described above, according to this embodiment, when predetermined items are filled in the original book registration slip by a general person in charge so as to match his own business contents, the intended file processing can be executed in accordance with these description contents.

More specifically, a correspondence between each item corresponding to the record arrangement of a data file and each item of a processing target file serving as a processing target in updating the records of this data file is set in an original book registration slip in advance. If the person in charge empirically understands necessary items for a file in execution of daily operations, the correspondence between the data file and the processing target file is described in the original book registration slip so as to match his own business contents, the file processing can be executed in accordance with the description contents.

In this case, when generation tables (journalizing table and expansion table) are registered in correspondence with the original book registration slip, data of the necessary items can be generated in accordance with the description contents of these generation tables. More specifically, when an arbitrary item constituting the processing target file and a generation item generated using the arbitrary item as a condition item are set in the journalizing and expansion tables, the journalizing and parts expansion processes are executed, and an item which is absent in the record of the processing target file can be generated. A record corresponding to the record arrangement of the data file is generated on the basis of the generation item and the record item of the processing target file, and the data file can be updated on the basis of the generated record.

In the journalizing table, "composite journalizing", "multiple journalizing", or "transfer journalizing" can be performed depending on the way of description. More specifically, the journalizing process is basically a process for extracting item data corresponding to a condition item set in the journalizing table from one record read out from the processing target file, retrieving a generation item corresponding to this condition item from the journalizing table, and generating one-record item data on the basis of this generation item. When the journalizing table is divided into a plurality of blocks, and the condition items are caused to correspond to the generation items in units of blocks, the generation items corresponding to the condition items of the respective blocks which are obtained from a record read out from the processing target file are retrieved from the journalizing table. These generation items are incorporated in one record, thereby performing "composite journalizing". When generation items of a plurality of records for the same condition item are set in the journalizing table, "multiple journalizing" is performed in which item data of the plurality of records are generated from one record read out from the processing target file. In addition, when an item set as a generation item of a given block is set as a condition item of a block different from the given block, "transfer journalizing" is performed in which the generation item is used as the condition item to retrieve data in the journalizing table, thereby generating item data.

In the expansion table, an arbitrary item in one record constituting a processing target file is defined as a condition item, and a record of a reference file which is retrieved based on this condition item is set as a generation item in the expansion table. A condition item is extracted from the record read out from the processing target file, and retrieval is performed in the reference file on the basis of this condition item to generate item data corresponding to the generation item for a plurality of records. In this case, if each record of the reference file has a hierarchical structure representing a parent-child relationship, item data of the plurality of records having the parent-child relationship can be generated.

In this embodiment, in updating a data file on the basis of the contents of a processing target file, batch activation, one-business activation, or expansion table activation can be arbitrarily selected and executed.

In the above embodiment, a journalizing table is divided into three blocks. However, the number of blocks can be arbitrarily set. In "composite journalizing", an item record generated on the basis of the generation items of three or more blocks may be incorporated in one record. In "transfer journalizing", the number of processing targets may be three or more blocks, and generation items generated by a given block may be hierarchically and sequentially processed as the condition items for the next block. In the above embodiment, the generation items of two records are caused to correspond to the same condition item. However, generation items of three or more records may be caused to correspond to the same condition item.

The journalizing table and the expansion table are exemplified as the generation tables in the above embodiment. However, other generation tables may be used. The file activation method is not limited to batch activation, one-business activation, and expansion table activation.

The forms of the original book registration slip and the journalizing and expansion tables serving as the generation tables are not limited to the ones in the above embodiment. Any form can be used if it is excellent in readability and consistency.

In the above embodiment, the slip names or file names set as the input original book names are set in different original book registration slips. However, the slip name and the file name may be set as the input original book names in one original book registration slip.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A file update processing apparatus for storing a plurality of files and for updating a desired one of the plurality of files, said apparatus comprising:

storage means for storing a file table having a first segment area and a plurality of second segment areas, said first segment area having a first field setting, as a table name, a file name of a file to be updated, and said plurality of second segment areas setting, as a file to be read out, a file storing item data for updating to the file to be updated;

first setting means for inputting and setting the file name of the file to be updated in the first field in the file table, and for setting, with respect to a second field in the file table, a plurality of items constituting a single record in the file to be updated;

second setting means for inputting and setting the file name of the file to be read out and a plurality of items to be read out from respective files to be read out in positions in one-to-one correspondence with individual item positions in the second field in the file table, with respect to individual second segment areas displaced in the file table;

generating means, responsive to a designation of a file update processing, for specifying from the plurality of files the file to be read out based on the file name inputted and set in one of the second segment areas in the file table, for extracting data of individual items inputted and set in a same segment area in the file table from the record stored in the specified file, and for generating a new record in which the extracted item data are assigned as data corresponding to individual items in the second field in the file table, said generating means being operable with respect to each and every one of the second segment areas; and file update means for updating a single file specified by the file name inputted and set in the first field in the file table based on an update class selected and set in a corresponding second segment area, using each record generated by the generating means for each of the plurality of second segment areas.

2. A file update processing apparatus for storing a plurality of files and for updating a desired one of the plurality of files, said apparatus comprising:

a first storage means for storing a file table in which a first segment area and a second segment area are displaced as a pair, said first segment area defining and setting a file to be updated and said second segment area defining and setting a file to be read out;

first setting means for inputting and setting, in the first segment area in the file table, a file name of the file to be updated and a plurality of items constituting a single record in the file to be updated;

second setting means for inputting and setting, in the second segment area in the file table, a file name of the file to be read out and a type of update class when updating the file to be updated using the file to be read out, and for inputting and setting items of item data to be read out from the file to be read out in positions in one-to-one correspondence with setting positions of the items inputted and set in the first segment area;

generating means, responsive to a designation of a file update processing, for specifying from the plurality of files the file to be read out in accordance with the file name set in the second segment area in the file table, for sequentially reading each record stored in the specified file, for extracting from a single record the item data of individual items set in the second segment area in units of read records in one-to-one correspondence, and for assigning the extracted individual item data as data of items in corresponding positions in the first segment area, to thereby generate a new record; and file update means for updating the file specified by the file name set in the first segment using the update class selected and set in the second segment area and using the individual records generated in one-to-one correspondence with the individual records read by the generating means.

3. The apparatus according to claim 2, further comprising:

second storage means for storing a fixed table in which predetermined fixed data correspond to contents of item data of predetermined items read out from the file to be read out; and third setting means for inputting and setting fixed items in positions not set by the second setting means in one-to-one correspondence with the setting positions of items inputted and set in the first segment area;

wherein the generation means includes means for retrieving from the fixed table the predetermined fixed data corresponding to the contents of item data of the predetermined items included in the record which has been read out to thereby extract the item data of the fixed items, and means for assigning the extracted item data as data of items of corresponding positions in the first segment area to thereby generate the new record.

* * * * *